US009479961B2

(12) United States Patent
Ree

(10) Patent No.: US 9,479,961 B2
(45) Date of Patent: Oct. 25, 2016

(54) FACILITATING MULTICAST TRAFFIC COLLISION REDUCTION

(71) Applicant: AT&T Intellectual Property I, L.P., Atlanta, GA (US)

(72) Inventor: Brad Ree, Cumming, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 151 days.

(21) Appl. No.: 14/021,270

(22) Filed: Sep. 9, 2013

(65) Prior Publication Data
US 2015/0071078 A1 Mar. 12, 2015

(51) Int. Cl.
| H04L 12/26 | (2006.01) |
| H04W 28/02 | (2009.01) |
| H04W 4/06 | (2009.01) |
| H04L 12/823 | (2013.01) |
| H04L 12/801 | (2013.01) |
| H04L 12/18 | (2006.01) |

(52) U.S. Cl.
CPC ...... *H04W 28/0294* (2013.01); *H04L 12/1868* (2013.01); *H04L 47/11* (2013.01); *H04L 47/323* (2013.01); *H04W 4/06* (2013.01)

(58) Field of Classification Search
None
See application file for complete search history.

(56) References Cited

U.S. PATENT DOCUMENTS

| 5,701,427 | A  | * | 12/1997 | Lathrop | H04L 12/1895 709/203 |
| 6,983,410 | B2 | * | 1/2006  | Chen    | H04L 1/1887 714/4.1 |
| 7,035,217 | B1 | * | 4/2006  | Vicisano | H04L 1/1671 370/236 |
| 7,095,739 | B2 | * | 8/2006  | Mamillapalli | H04L 12/56 370/312 |
| 7,269,147 | B2 |   | 9/2007  | Kim et al. | |
| 7,673,060 | B2 | * | 3/2010  | Walls | H04L 12/1868 709/230 |
| 8,711,702 | B2 | * | 4/2014  | Kim et al. | 370/237 |
| 2006/0007930 | A1 |   | 1/2006 | Dorenbosch | |
| 2006/0183421 | A1 | * | 8/2006 | Proctor, Jr. | H04B 7/15521 455/11.1 |
| 2006/0215686 | A1 | * | 9/2006 | Takeuchi | H04W 28/18 370/445 |
| 2007/0076739 | A1 |   | 4/2007 | Manjeshwar et al. | |
| 2007/0174885 | A1 |   | 7/2007 | Hus et al. | |
| 2007/0192451 | A1 | * | 8/2007 | Tran et al. | 709/223 |
| 2007/0258466 | A1 |   | 11/2007 | Kakani | |
| 2007/0286121 | A1 |   | 12/2007 | Kolakowski et al. | |

(Continued)

OTHER PUBLICATIONS

Sadok et al., "An Enhanced Reliable Mulitcast Protocol for Wireless Environments", Vehicular Technology Conference, 2000.IEEE-VTS Fall VTC 2000. 52nd. Sep. 2000. vol. 2, pp. 975-892, on the record-see IDS (Dec. 10, 2013).*

(Continued)

*Primary Examiner* — Nicholas Sloms
(74) *Attorney, Agent, or Firm* — Amin, Turocy & Watson, LLP

(57) ABSTRACT

The reduction of multicast traffic collisions is facilitated. A device that is associated with a multicast group receives a multicast message requesting re-transmission of an acknowledgment message from the device. The multicast message includes information identifying the device within the multicast group of devices. In response to the device being determined to be identified by the information, the acknowledgement message can be re-transmitted after a defined transmit delay period after receipt of the multicast message. The defined transmit delay period can be based on the number of devices in the multicast group, based on the number of previous re-transmissions by the device and/or based on the number of devices for which re-transmission is requested.

20 Claims, 15 Drawing Sheets

(56) References Cited

U.S. PATENT DOCUMENTS

| | | | |
|---|---|---|---|
| 2009/0006641 A1* | 1/2009 | Yaqoob et al. | 709/231 |
| 2010/0153807 A1 | 6/2010 | Kakani | |
| 2010/0162318 A1* | 6/2010 | Smith | H04N 21/4331 725/50 |
| 2011/0080977 A1* | 4/2011 | Liu | H04W 72/005 375/316 |
| 2011/0116435 A1* | 5/2011 | Liu | H04L 1/1664 370/312 |
| 2012/0082107 A1* | 4/2012 | Ou | H04W 74/0833 370/329 |
| 2012/0088536 A1* | 4/2012 | Hwang | H04W 74/0816 455/515 |
| 2012/0106427 A1* | 5/2012 | Nakae | H04L 12/1868 370/312 |
| 2012/0113986 A1* | 5/2012 | Shaffer et al. | 370/390 |
| 2012/0117438 A1* | 5/2012 | Shaffer et al. | 714/749 |
| 2013/0051388 A1* | 2/2013 | Pantelidou et al. | 370/390 |
| 2013/0089020 A1 | 4/2013 | Hakola et al. | |
| 2013/0170352 A1* | 7/2013 | Anchan | H04L 12/1868 370/235 |
| 2014/0355493 A1* | 12/2014 | Niu | H04L 12/189 370/280 |
| 2015/0049723 A1* | 2/2015 | Fong | H04L 1/1812 370/329 |

OTHER PUBLICATIONS

Maxemchuk, N.F., "A Reliable Multicast Protocol With Delay Guarantees", Published Sep. 2002, Columbia University, pp. 1-14, (http://www.ee.columbia.edu/~nick/ref.1677.pdf; also can retrieve at http://ieeexplore.ieee.org/xpls/abs_all.jsp?arnumber=1031835 &tag=1) accessed Sep. 15, 2015.*

Sadok, et al. "An Enhanced Reliable Multicast Protocol for Wireless Environments." Vehicular Technology Conference, 2000. IEEE-VTS Fall VTC 2000. 52nd. Sep. 2000. vol. 2 pp. 975-982. Retrieved on Jun. 25, 2013, 8 pages.

* cited by examiner

FACILITATING MULTICAST TRAFFIC COLLISION REDUCTION

TECHNICAL FIELD

The subject disclosure relates generally to multicast communications, and specifically to facilitating multicast traffic collision reduction.

BACKGROUND

A multicast message is a message simultaneously or concurrently transmitted to a selected group of devices from a multicast source device (MSD). These types of messages are useful for efficiently informing the group of information. However, of importance is ensuring that the MSD know that each device in the multicast group has successfully received the multicast message. In conventional approaches, either the receipt of multicast messages is unable to be confirmed by the MSD or acknowledgement messages are sent from every device in the multicast group to the MSD. If the MSD does not receive an acknowledgement message from a particular device, typically, the MSD multicasts a request for re-transmission of acknowledgment messages to the group of devices in the multicast group. Each device in the multicast group typically responds with another acknowledgment message. Significant numbers of multicast traffic collisions of the acknowledgment messages can result.

DETAILED DESCRIPTION

Figure 1:
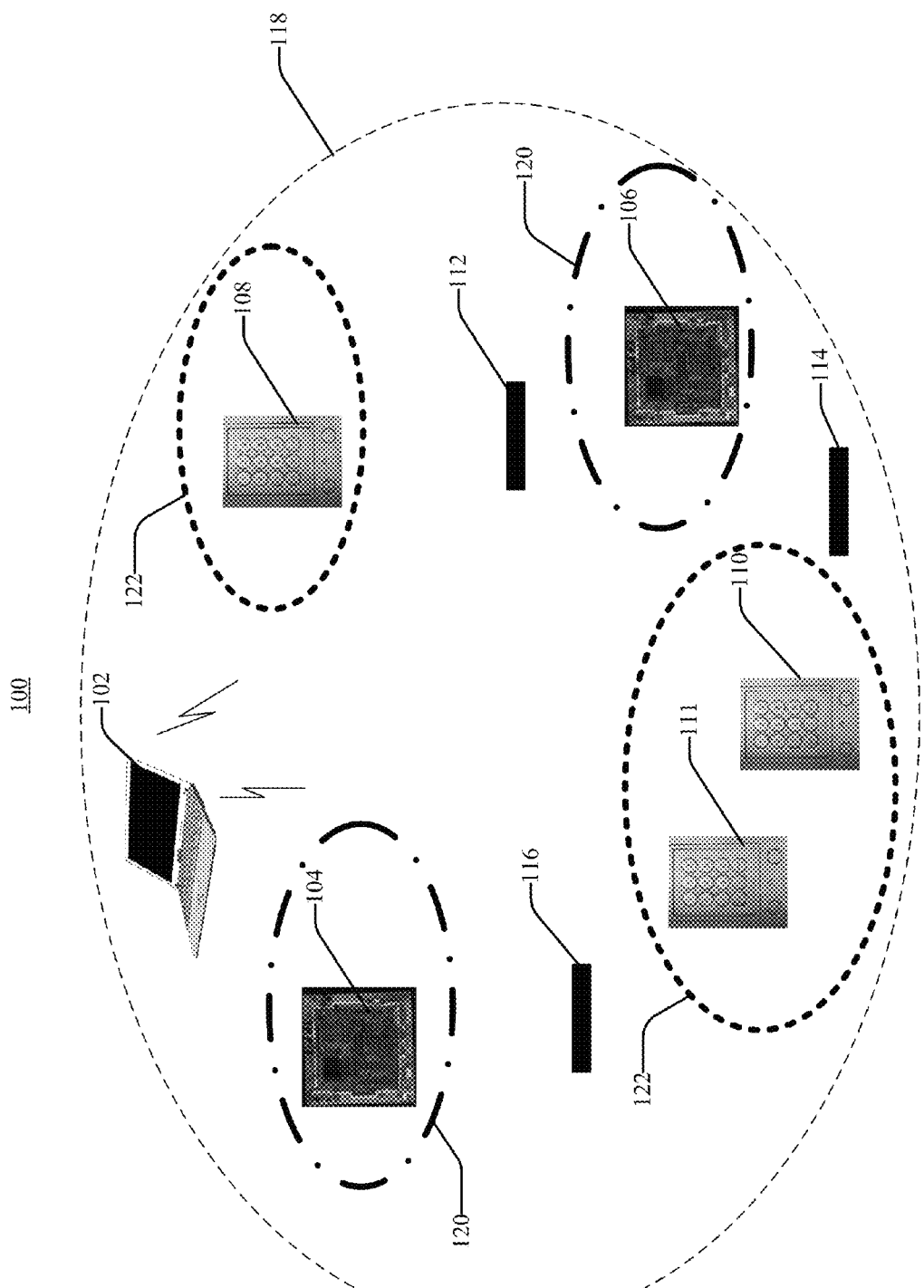
FIG. 1 illustrates an example block diagram of a system configured to facilitate multicast traffic collision reduction in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example"

or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (femto cell device)," "Node B," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "mobile device," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies. Further, the term "femto" and "femto cell" are used interchangeably, and the terms "macro" and "macro cell" are used interchangeably.

Multicast messages are useful for efficiently informing a group of devices in a network of information. As used herein, "multicast" means transmission from one device to a selected group of devices in a network. Specifically, a multicast message is a message simultaneously or concurrently transmitted, in a single transmission from an MSD, to a selected group of devices. Copies of the message transmitted can be created and forwarded on by repeaters in the network when network topology warrants such. Distinct from broadcasting, which refers to sending a message to every device connected to a network, multicast messages are only sent to a specific group of devices within the entire set of devices connected to a network. Multicast messages can be transmitted from the MSD over wired or wireless channels. For example, internet protocol (IP) multicast can be employed in IP applications (e.g., streaming media applications). Multicasting can be employed to facilitate applications such as teleconferencing and videoconferencing as well.

In the embodiments described herein, multicasting can also be employed in various residential and commercial uses including, but not limited to, security and safety alarm systems. For example, the network can include an MSD, a first multicast group of control centers (e.g., keypads) and a second multicast group of sensors configured to detect various security breaches or safety concerns (e.g., fire, carbon monoxide) and, in some embodiments, emit a siren to provide notification in the immediate environment of a detected condition. Multicast messages can be transmitted to the entire group of keypads in one instance and to the entire set of sensors in another instance. Power on/off functions, re-configurations, dynamic and efficient modification of operation can each be accomplished via multicast messaging towards a synchronized security or property safety system. In various embodiments, the devices in a multicast group can be in the same geographic area but need not be so. In various embodiments, the devices in a multicast group can have varying degrees of similarity in operation or structure with other devices in the multicast group.

Of importance is ensuring that the MSD knows that each device in the multicast group has successfully received the multicast message. Embodiments described herein can provide systems, apparatuses, methods and computer-readable storage media facilitating multicast traffic collision reduction.

In one embodiment, an apparatus is provided. The apparatus can include a memory configured to store computer-executable instructions, and a processor, communicatively coupled to the memory, and configured to facilitate execution of computer-executable instructions to perform operations. The operations can include receiving a multicast message requesting re-transmission of an acknowledgment message for the apparatus, wherein the multicast message comprises information identifying the apparatus within a multicast group of apparatuses. The operations can also include, in response to the apparatus being determined to be identified by the information, re-transmitting the acknowledgement message after a defined transmit delay period after the receiving. As used herein, the terms "transmit delay period" and "transmit delay" are interchangeable and each represent the amount of time a device waits before re-transmitting (or, in some embodiments, before transmitting in the first instance) information (e.g., re-transmission of an acknowledgment message). As used herein, the terms "back off period" and "back off delay" are interchangeable and each represent the amount of time a device waits before re-transmitting (or, in some embodiments, before transmitting in the first instance) information (e.g., re-transmission of an acknowledgment message). The back off period can be employed in some embodiments, upon detection of a busy channel at the time that the device is ready to transmit. While any number of different units of time can be employed for transmit delay period and/or back off period, n the embodiments described, the millisecond (ms) unit of time is employed.

In one embodiment, a method is provided. The method can include receiving, by a device comprising a processor and included in a multicast group of devices, a multicast message requesting re-transmission of an acknowledgment message for the device, wherein the multicast message comprises information identifying the device within the multicast group of devices. The method can also include, in response to the device being determined to be identified by the information, transmitting, by the device, the acknowledgement message after a defined transmit delay period after the receiving.

In one embodiment, a computer-readable storage device is provided. The computer-readable storage device stores computer-executable instructions that, in response to execution, cause a device comprising a processor to perform operations. The operations can include receiving a multicast message requesting re-transmission of a message by the device, wherein the multicast message comprises information identifying the device within a multicast group of devices. The operations can also include, in response to the device being determined to be identified by the information, re-transmitting the message after a defined transmit delay period following reception of the multicast message.

One or more embodiments can advantageously reduce multicast collisions. As such, system reliability can be increased while congestion decreased (relative to systems not employing the embodiments described herein). One or more embodiments can also facilitate synchronized action amongst the devices in the multicast group (or the appearance of synchronization amongst such devices). Synchronization (or the appearance thereof) can be particularly advantageous towards increasing quality of user experience.

FIG. 1 illustrates an example block diagram of a system configured to facilitate multicast traffic collision reduction in accordance with one or more embodiments described herein. System 100 includes MSD 102, devices 104, 106, 108, 110, 111, repeater devices 112, 114, 116 and network 118. In various different embodiments, one or more of MSD 102, devices 104, 106, 108, 110, 111, repeater devices 112, 114, 116 can be communicatively coupled and/or electrically coupled to one another (or devices 104, 106, 108, 110, 111 can be communicatively coupled and/or electrically coupled to MSD 102) in any number of different configurations to facilitate reduction of multicast traffic collision.

While devices 104, 106, 108, 110, 111 can be communicatively coupled or electrically coupled to network 118, in some embodiments, devices 104, 106 can be included in a first multicast group 120 while devices 108, 110, 111 can be included in a second multicast group 122. Accordingly, MSD 102 can multicast a first set of information to multicast group 120 and multicast a second set of information to multicast group 122.

In various embodiments, devices 104, 106, 108, 110, 111 can include software, hardware or a combination of software and hardware. Devices 104, 106, 108, 110, 111 can be sensor devices, keypads, personal computers, laptops, mobile telephones or any number of other devices configured to receive a multicast message from MSD 102 and transmit a message in respond to the received multicast message. The transmitted message can be a unicast message to MSD 102 in some embodiments.

In the embodiment shown, devices 104, 106 are sensor devices and devices 108, 110, 111 are keypads. Devices 104, 106, 108, 110, 111 can be part of a residential or commercial security system and/or a residential or commercial safety system (e.g., fire monitoring system). In this embodiment, multicast group 122 includes of control centers (e.g., keypads) while multicast group 120 includes sensors. The sensors can be configured to detect various security breaches or safety concerns (e.g., fire, carbon monoxide) and, in some embodiments, emit a siren to provide notification in the immediate environment of a detected condition. In some embodiments, the sensors can be configured with camera functionality and can monitor various physical areas within the residential or commercial establishment at which the sensor is located. MSD 102 can control power on/off functions, re-configurations, and/or dynamic and efficient modification of operation via multicast messaging. In various embodiments, devices 104, 106, 108, 110, 111 can be in the same geographic area but need not be so. In various embodiments, the devices in a multicast group can have varying degrees of similarity in operation or structure with other devices in the multicast group.

While devices in the same multicast group are shown to be the same or similar devices, in various embodiments, one or more devices in the same multicast group can have varying degrees of similarity and need not have the same or similar structure and/or functionality.

Communication with MSD 102 can include receipt of a multicast message from MSD 102 and/or transmission or re-transmission of a message to MSD 102. For example, devices 104, 106, 108, 110, 111 can be configured to transmit or re-transmit acknowledgement messages (among other types of messages) to MSD 102. Transmission or re-transmission can be via unicast (e.g., one-to-one) messaging in some embodiments.

In various embodiments, the acknowledgment messages can be formatted according to any of a number of different communication protocols. In various embodiments, a request for an acknowledgment message can be communicated to devices 104, 106, 108, 110, 111 using any number of different types of information in the multicast message. For example, in some embodiments, the request can be represented by an event code recognizable by devices 104, 106, 108, 110, 111 as a command to re-transmit an acknowledgment message for an identified previously-multicast message. The previously-multicast message can be identified in a number of ways including, but not limited to, based on received signal strength information (RSSI) for the multicast message, a packet identifier for the packet in which a multicast message can be transmitted or the like.

In some embodiments, devices 104, 106, 108, 110, 111 can be configured to transmit or re-transmit an exception if the multicast message is malformed, or if an event code associated with the multicast message is not recognized by devices 104, 106, 108, 110, 111.

As shown, system 100 can also include repeater devices 112, 114, 116. Repeater devices 112, 114, 116 can be configured to receive a signal from a transmitting device and re-transmit the received signal to another device. In the embodiment shown, one or more of repeater devices 112, 114, 116 can be configured to receive a multicast message from MSD 102 and re-transmit the received multicast message to one or more of devices 104, 106, 108, 110, 111. Similarly, in some embodiments, repeater devices 112, 114, 116 can be configured to receive a message from one or more of devices 104, 106, 108, 110, 111 intended for MSD 102 and re-transmit the message to MSD 102. In some embodiments, the message received for, and re-transmitted to, MSD 102 can be an acknowledgment message confirming that one of devices 104, 106, 108, 110, 111 successfully received a multicast message from MSD 102. In some embodiments, the acknowledgement message can be unicast to the MSD 102 from the device receiving the request for re-transmitted acknowledgement message.

While repeater devices 112, 114, 116 are shown in FIG. 1, in some embodiments, system 100 does not include repeater devices 112, 114, 116. For example, in embodiments in which the topology of network 118 does not warrant repeater devices (e.g., devices 104, 106, 108, 110, 111 are located within a geographic proximity of MSD 102 such that a signal transmitted from MSD 102 can be received by devices 104, 106, 108, 110, 111 without being received and re-transmitted from one or more of repeater devices 112, 114, 116).

Network 118 can be any number of different types of networks facilitating one-to-many and one-to-one communication and can be configured according to any number of different communication protocols described herein. In some embodiments, network 118 is a wireless network providing bi-directional communication between one or more of devices 104, 106, 108, 110, 111 and/or between one or more of devices 104, 106, 108, 110, 111 and MSD 102. For example, network 118 can be a wireless network configured to transmit one or more multicast messages to devices 104, 106 in multicast group 120 and one or more multicast messages to devices 108, 110, 111 in multicast group 122. Network 118 can also allow transmission of messages between devices 104, 106, 108, 110, 111 and MSD 102. While a wireless network is shown, in some embodiments, network 118 is a wired network.

The transmission of messages from one or more of multicast groups 120, 122 can be over a common channel in some embodiments. As such, collisions of traffic transmitted from devices in the same multicast group and intended for MSD 102 can occur from time to time. System 100 and/or components thereof can facilitate reduction of collisions of multicast traffic by multicast addressing that requests re-transmission of acknowledgments from specific devices within a multicast group (as opposed to sending a multicast message identifying only the multicast group resulting in re-transmission of acknowledgment messages from each device in the multicast group). In some embodiments, to also reduce likelihood of collisions of multicast traffic, a device of devices 104, 106, 108, 110, 111 selected for re-transmission of an acknowledgment message can determine either a transmit delay period, or a back off period, to wait after receipt of request for re-transmission, and can re-transmit the acknowledgment message after waiting (or, in some embodiments, substantially waiting) the transmit delay period or the back off period. In various embodiments, the back off period can be a determined amount of time to wait prior to re-transmission. The transmit delay period can include the back off period and an offset and thus also represent a determined amount of time to wait prior to re-transmission. Various different embodiments utilizing back off period only and transmit delay period, including back off period, are described herein.

One or more embodiments of the structure and/or functionality of MSD 102 is described in greater detail with reference to FIGS. 2, 3 and 4. One or more embodiments of the structure and/or functionality of devices 104, 106, 108, 110, 111 is described in greater detail with reference to FIGS. 5, 6 and 7.

Figure 2:
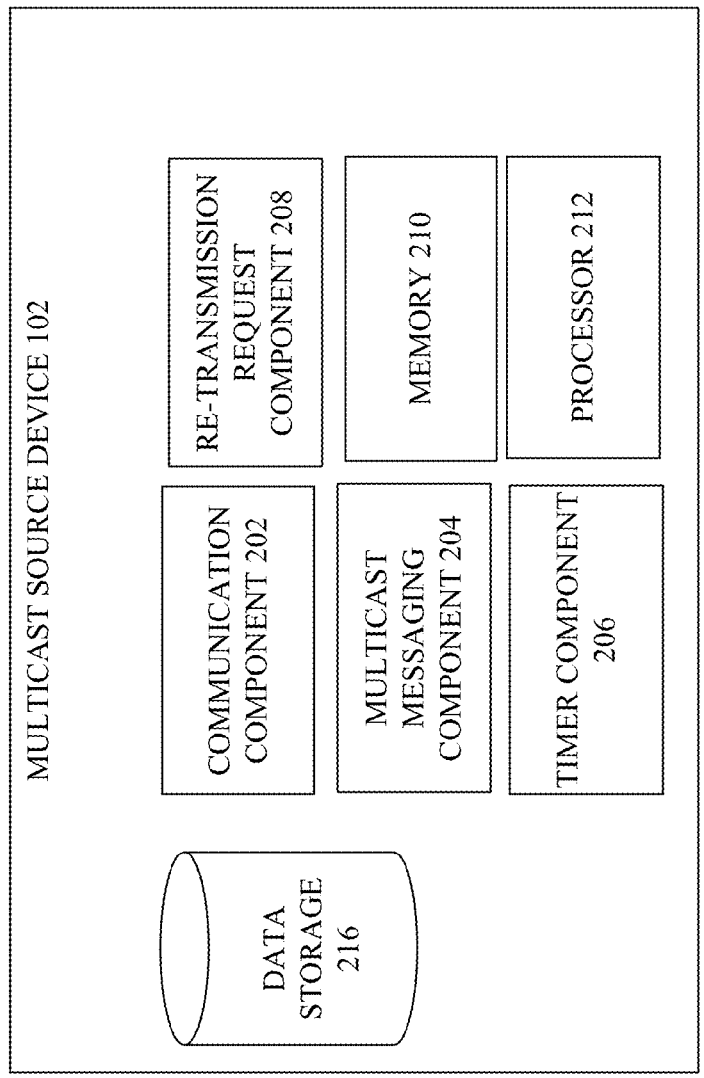
FIG. 2 illustrates an example block diagram of an MSD configured to facilitate multicast traffic collision reduction in accordance with one or more embodiments described herein.
Figure 3:
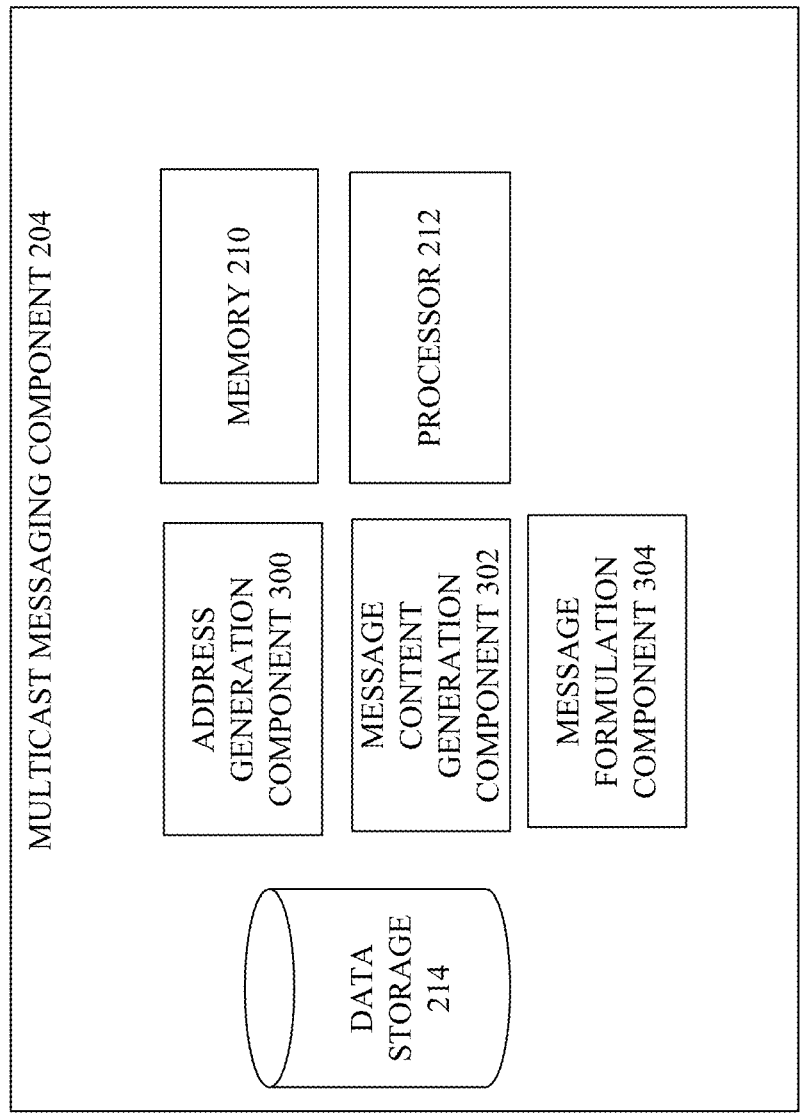
FIG. 3 illustrates an example block diagram of a multicast messaging component of an MSD configured to facilitate multicast traffic collision reduction in accordance with one or more embodiments described herein.
Figure 4:
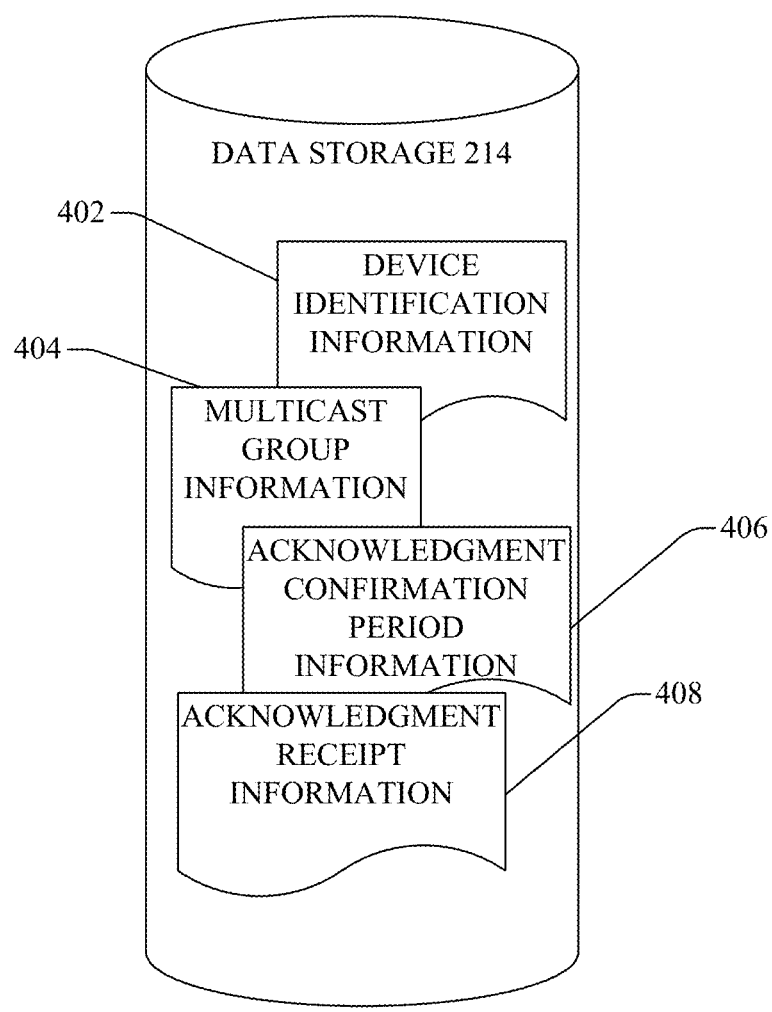
FIG. 4 illustrates an example block diagram of data storage of the MSD of FIG. 2 in accordance with embodiments described herein.

Turning first to FIGS. 2, 3 and 4, FIG. 2 illustrates an example block diagram of an MSD configured to facilitate multicast traffic collision reduction in accordance with one or more embodiments described herein. FIG. 3 illustrates an example block diagram of a multicast messaging component of an MSD configured to facilitate multicast traffic collision reduction in accordance with one or more embodiments described herein. FIG. 4 illustrates an example block diagram of data storage of the MSD of FIG. 2 in accordance with embodiments described herein. Repetitive description of like elements employed in respective embodiments of systems and/or apparatus described herein are omitted for sake of brevity.

As shown, MSD 102 can include communication component 202, multicast messaging component 204, timer component 206, re-transmission request component 208, memory 210, processor 212 and/or data storage 214. In various embodiments, one or more of communication component 202, multicast messaging component 204, timer component 206, re-transmission request component 208, memory 210, processor 212 and/or data storage 214 can be communicatively and/or electrically coupled to one another to perform one or more functions of MSD 102.

With reference to FIGS. 1, 2, 3 and 4, communication component 202 can transmit and/or receive information to and/or from devices 104, 106, 108, 110, 111 (or from one or more other devices communicatively coupled to network 118). For example, in various embodiments, communication component 202 can transmit and/or receive voice, video, text, data or a combination of voice, video, text and/or data messages to and/or from devices 104, 106, 108, 110, 111. In various embodiments, communication component 202 can multicast a message to a subset of devices 104, 106, 108, 110, 111 in network 118 that are in the same multicast group. For these functions, communication component 202 can include a transceiver, transmitter and/or receiver in various embodiments.

Multicast messaging component 204 can include structure, hardware, software and/or functionality configured to generate a multicast message, such as the multicast message that MSD 102 can multicast to devices 108, 110, 111 in multicast group 122. Multicast messaging component 204 can be described in greater detail with reference to FIG. 3.

Turning to FIG. 3, as shown, multicast messaging component 204 can include address generation component 300, message content generation component 302, message formulation component 304, memory 210, processor 212 and/or data storage 214. One or more of address generation component 300, message content generation component 302, message formulation component 304, memory 210, processor 212 and/or data storage 214 can be communicatively and/or electrically coupled to one another to perform one or more functions of multicast messaging component 204.

In some embodiments, address generation component 300 can generate address information for a multicast message. Address information can include information indicative of an identifier of a multicast group and/or an identification of a device within the multicast group. In this manner, a multicast message can be directed to an entire multicast group but, if desired, can include information to specify one or more devices within the group. Accordingly, requested action (e.g., re-transmission of an acknowledgement message) can be communicated to the particular device of interest.

In some embodiments, address generation component 300 can generate or access information including first address information associated with or assigned to a device in network 118. For example, the first address information can be associated with or assigned to the device once the device has been discovered in the network 118. In some embodiments, different first address information can be generated for up to 254 devices in network 118.

In one embodiment, when a device joins a multicast group, address generation component 300 can assign the device a device value that indicates to the device the multicast group to which the device is assigned. The assignment can be transmitted by unicast in some embodiments. The device value can be employed by the device to determine the time slot in which the device would typically transmit. For example, if a device is assigned device value bit 0, the device transmits in the first slot. If a device is assigned device value bit 1, the device transmits in the second slot. Accordingly, with an increase in a number of devices in a multicast group, a device can be significantly delayed in transmission. Embodiments herein address and alleviate the extended latency that would typically result.

Address generation component 300 can also generate or access information including second address information associated with or assigned to a multicast group in network 118. For example, a multicast group can be identified by the value of one or more bits in an address for the multicast message. In one embodiment, the multicast group can be associated with or assigned to a short address.

In some embodiments, address generation component 300 can include information indicative of the number of devices in the multicast group. For example, a multicast acknowledgement flag can be a three bit portion of information having a value indicative of the number of devices in a multicast group to which a re-transmission request is being transmitted by MSD 102.

In some embodiments, address generation component 300 can set one or more of the flags in a multicast message packet to values to identify the one or more devices in the multicast group requested to send an acknowledgement to MSD 102. For example, when an initial message is sent by MSD 102, MSD 102 can set all flags in the multicast message indicating that all devices in the multicast group are to send an acknowledgement message in response to the multicast message. For example, in a multicast group of eight devices, the address generation component 300 can set the flag to indicate that each device of the multicast group is requested to send an acknowledgement message. Each bit in the multicast acknowledgement flag can indicate if a particular device in the identified multicast group should re-transmit an acknowledgement message.

In some embodiments, address generation component 300 can include multicast acknowledgement request information. For example, the multicast acknowledgement request information can be the last byte of the payload of the packet in which the multicast message is transmitted. The last byte of the payload of the packet can be a bit encoding that indicates the identity of the device in the multicast group for which an acknowledgement is requested.

In various embodiments, other information than address information can be used in association with a device, or as part of a process to generate an address for the device. For example, at the time of device discovery, a serial number associated with a device can be transmitted to MSD 102. Based on receipt of the serial number, address generation component 300 can generate address information for the device and/or transmit a message to the device indicating that the device is registered with MSD 102. In some embodiments, a bit mask can indicate the identity of a device within a multicast group of devices.

Message content generation component 302 can generate and/or format the multicast message body. Content can include, but is not limited to, voice, video, data and/or text. The content can be provided in a payload of the multicast message. In some embodiments, the first byte of the payload can include a first type of information and the last byte of the payload can include a second type of information.

For example, a multicast message can include a first type of information that includes a specific command for the one or more devices for which the message is intended. For example, the command can be to re-transmit an acknowledgment message. In some embodiments, the multicast message can include a second type of information indicating the one or more devices in the multicast group for which re-transmission of the acknowledgment message is requested. In some embodiments, the information identifying the one or more devices for which action is requested is encrypted. One or more devices of the multicast group can then decrypt the encrypted portion using a key (e.g., multicast key).

In one embodiment, the multicast message requesting re-transmission of the acknowledgement message can be a packet including information at designated locations for allowing a device to determine whether a re-transmission request is intended for the device.

In some embodiments, multicast messaging component 204 can generate a back off index value to be included in the multicast message. The back off index value can be a value employed by a recipient device to generate the back off period that the device can wait prior to re-transmitting the acknowledgment message after receipt of the request for the message. As previously described, the back off period can also be employed in computing a transmit delay period that the device can wait prior to re-transmitting the acknowledgement message after receipt of the request for the message.

In some embodiments, message content generation component 302 can determine the back off index value based on a number of devices in a multicast group to which the request for re-transmission is being sent. For example, for multicast groups having greater numbers of devices, the back off index value can be greater. By contrast, for multicast groups having lesser numbers of devices, the back off index value can be less.

By way of another example, but not limitation, in embodiments in which the multicast group to which the device is associated includes less than three devices, the back off index value can be 2. For embodiments in which the multicast group to which the device is associated includes between 3 and 6 devices, the back off index value can be 3. For embodiments in which the multicast group to which the device is associated includes greater than 6 devices, the back off index value can be 4.

In some embodiments, in lieu of selecting the back off index value based on the number of devices in the multicast group, in some embodiments, message content generation component 302 selects a maximum possible value for inclusion in all multicast messages requesting re-transmission of an acknowledgement message. In some embodiments, the maximum value is 7.

In some embodiments, message content generation component 302 can select the back off index value based on a number of acknowledgment messages previously re-transmitted from a device prior to the current request for re-transmission of an acknowledgment message from the device. For example, the back off index value can be incremented by 2 for every previous packet re-transmission by a device, and decremented by 1 for every acknowledgement message previously-received from the device. Accordingly, the back off index value can be a function of the congestion (and corresponding received or re-transmitted packets, the numbers of which can be affected by such congestion).

The back off index value can be employed by the device for which acknowledgment message re-transmission is requested. Specifically, the device can employ the back off index value to determine the back off period to wait prior to re-transmitting the acknowledgment message as described in greater detail with reference to FIG. 6.

Message formulation component 304 can combine (e.g., concatenate) the address information and the content of the multicast message. In some embodiments, message formulation component 304 can also format the multicast message for transmission by communication component 202. In various embodiments, message formulation component 304 can format the address information and/or content according to any number of different communication standards for transmission of multicast messages.

Turning back to FIG. 2, in addition to a communication component 202 and multicast messaging component 204, MSD 102 can also include timer component 206. Timer component 206 can be configured to track an amount of time that has elapsed since transmission of multicast message by communication component 202. As such, if a multicast message has been transmitted to multicast group 122, timer component 206 can enable MSD 102 to determine whether a defined acknowledgment confirmation period (ACP) has elapsed for receipt of all acknowledgment messages from devices 108, 110, 111.

Re-transmission request component 208 can receive a signal from timer component 206 when ACP has elapsed and determine whether an acknowledgment message has not been received for any of devices 108, 110, 111. In some embodiments, re-transmission request component 208 can generate information indicative of whether acknowledgement messages have been received from all devices for which a multicast message was sent by MSD 102 and/or identify devices from which acknowledgement messages were received or were not received.

In embodiments, in which re-transmission request component 208 determines that acknowledgement messages have been received from all devices to which a multicast message was sent, re-transmission request component 208 can forego outputting a signal to cause multicast messaging component 204 to generate a request for a re-transmission of an acknowledgment message (or output a signal causing multicast messaging component 204 to forego generating the request for the re-transmission of the acknowledgment message).

In embodiments in which re-transmission request component 208 determines that an acknowledgment message has not been received from one or more devices of devices 108, 110, 111, re-transmission request component 208 can output information to multicast messaging component 204 causing multicast messaging component 204 to generate a multicast message for group 122 that includes information identifying one or more of devices 108, 110, 111 for which an acknowledgment message was not received by MSD 102, and requesting re-transmission of the acknowledgement message.

Memory 210 can be a computer-readable storage medium storing computer-executable instructions and/or information for performing the functions described herein with reference to MSD 102 (or any component of MSD 102). For example, memory 210 can store computer-executable instructions that can be executed by processor 212 to perform multicast message generation, processing or other types of functions executed by MSD 102. Processor 212 can perform one or more of the functions described herein with reference to MSD 102 (or any component thereof). For example, processor 212 can generate content of a multicast message, generate an address identifying specific devices within a multicast group from which to request re-transmission of an acknowledgement message, determine whether the ACP has elapsed, perform other multicast communication processing functions or the like.

Data storage 214 can be described in greater detail with reference to FIG. 4. As shown in FIG. 4, data storage 214 can be configured to store information accessed by, received by and/or processed by MSD 102. For example, data storage 214 can store device identification information 402 such as information identifying an address for a device in a multicast group. As another example, data storage 214 can store multicast group information 404 such as information identifying various multicast groups and/or devices within a multicast group, or information associated with addresses for a multicast group and/or devices within the multicast group. As another example, data storage 214 can store ACP information 404 such as information indicative of one or more time periods that MCP 102 can wait for an acknowledgement from a device prior to sending a request to re-transmit the acknowledgement message. As another example, data storage 214 can store acknowledgment receipt information 408 such as information identifying devices for which an acknowledgment has been received (or has not been received) in association with a particular multicast message.

Accordingly, as described above, in some embodiments, MSD 102 transmits a multicast message to multicast group 122, which includes devices 108, 110, 111. The multicast message includes information identifying the multicast group 122 as the intended destination of the multicast message.

MSD 102 awaits receipt of acknowledgment messages from devices 108, 110, 111 confirming successful receipt of the multicast message. After failure to receive an acknowledgment message from one or more of devices 108, 110, 111 after a defined ACP after multicast of the multicast message, MSD 102 multicasts a request for re-transmission of the acknowledgment message. However, the message including the request for re-transmission includes information identifying the one or more devices from which no acknowledgment message was received (as opposed to identifying only the multicast group). For example, in an embodiment in which MSD 102 failed to receive an acknowledgment from devices 108, 110 during the ACP, MSD 102 can multicast a second multicast message identifying multicast group 122 and devices 108, 110 and including a request for re-transmission of an acknowledgment of the first multicast message sent by MSD 102. Accordingly, while devices 108, 110, 111 each receive the second multicast message requesting re-transmission of an acknowledgment message, devices 108, 110 re-transmit the acknowledgment message while device 111 foregoes re-transmission of acknowledgment message thereby reducing the amount of multicast traffic intended for MSD 102. As such, the likelihood of collision of traffic from devices 108, 110 in multicast group 122 is reduced relative to systems that do not include information for targeting specific devices from which re-transmitted acknowledgment messages are requested (and for which devices 108, 110, 111 would each typically re-transmit an acknowledgment message to MSD 102). In various embodiments, any number of devices in a multicast group can be identified by MSD 102 in a multicast message requesting re-transmission of an acknowledgment message.

The method can be repeated by the MSD 102 until acknowledgements are received from each device in multicast group 122 for a particular multicast message transmitted by the MSD 102. Accordingly, the number of devices that need to re-transmit an acknowledgment message can be decreased with each iteration of requests for re-transmission acknowledging receipt of a particular multicast message. Specifically, as more acknowledgement messages are received by MSD 102 in response to the request by MSD 102, the number of outstanding acknowledgement messages to be re-transmitted decreases, and the likelihood for collisions of acknowledgment messages correspondingly decreases.

A further improvement on the embodiments described can include devices performing back off for a determined back off period, or for a determined transmit delay period (which can include back off period and an offset) prior to re-transmitting the acknowledgment message. These embodiments further improve the likelihood that there will not be a collision between the traffic from two devices re-transmitting acknowledgments, for example. Accordingly, based on the example provided above, identification of devices 108, 110 (out of devices 108, 110, 111) reduces traffic and for devices 108, 110, likelihood of collision is reduced due to back off.

Two approaches can therefore facilitate the likelihood of collision traffic reduction. Further, in some embodiments, back off can be used independent of identifying specific devices for re-transmission (in lieu of using both approaches concurrently).

Turning back to the drawings, in embodiments in which MSD 102 requests a device re-transmit an acknowledgment message, in lieu of the device immediately transmitting the acknowledgment message upon receipt of the request from the MSD 102, the device can determine a back off period and wait until the back off period has elapsed before transmitting the requested acknowledgment message to MSD 102. For example, in some embodiments, devices 108, 110 can determine a back off period to wait after receipt of the second multicast message requesting re-transmission of an acknowledgment. In various embodiments, the back off period can be a function of the number of devices in network 118, the number of devices for which an acknowledgment is requested to be re-transmitted in multicast group 122, the combined number of devices and repeater devices in network 118, a back off index value or any combination thereof.

Figure 5:
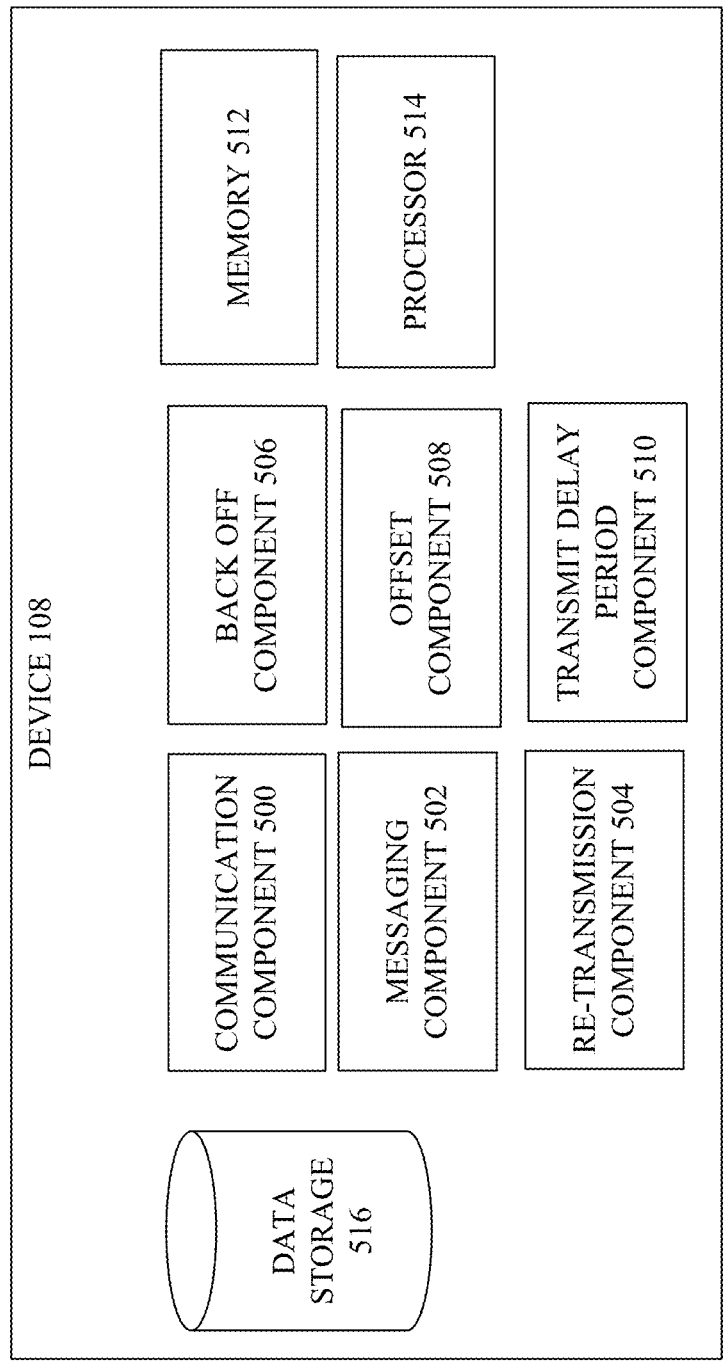
FIG. 5 illustrates an example block diagram of a device in a multicast group of devices for which multicast traffic collision reduction can be facilitated in accordance with one or more embodiments described herein.
Figure 6:
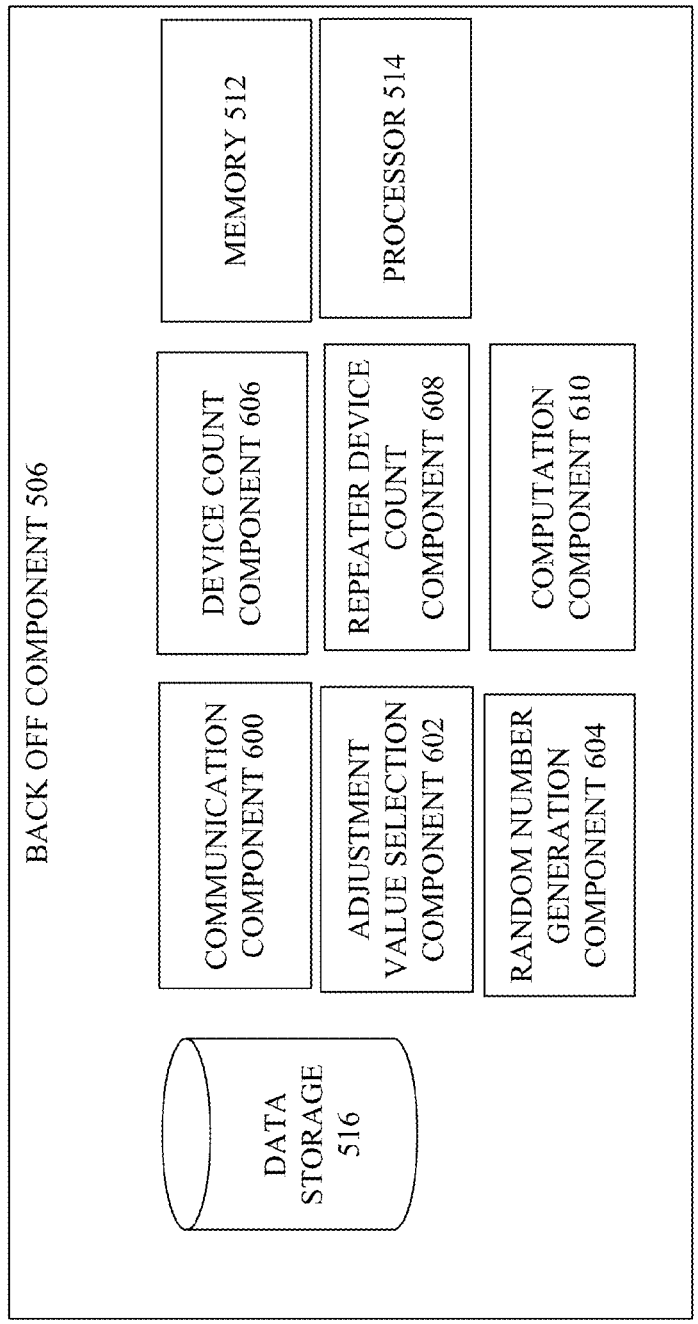
FIG. 6 illustrates an example block diagram of a back off component of a device in a multicast group of devices for which multicast traffic collision reduction can be facilitated in accordance with one or more embodiments described herein.
Figure 7:
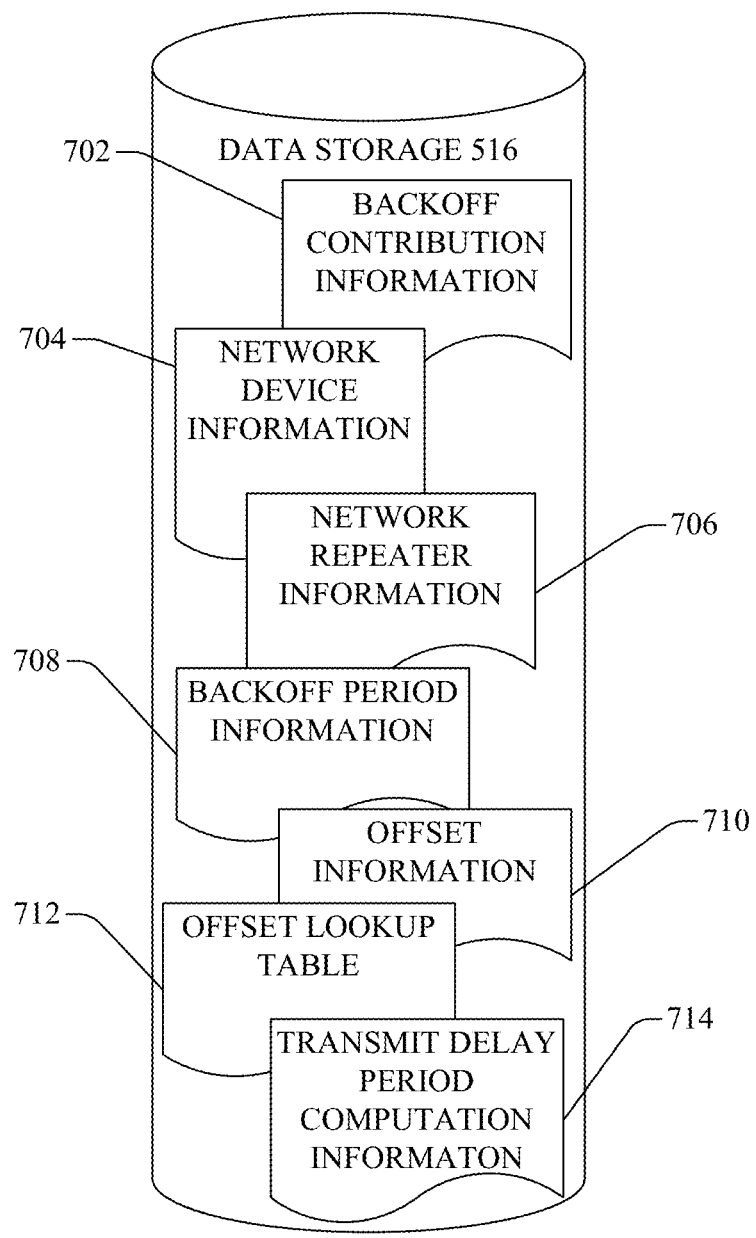
FIG. 7 illustrates an example block diagram of data storage of the device of FIG. 5 in accordance with embodiments described herein.

One or more of the structure and/or functionality of the devices that perform back off can be described in greater detail with reference to FIGS. 5, 6 and 7. FIG. 5 illustrates an example block diagram of a device in a multicast group of devices for which multicast traffic collision reduction can be facilitated in accordance with one or more embodiments described herein. FIG. 6 illustrates an example block diagram of a back off component of a device in a multicast group of devices for which multicast traffic collision reduction can be facilitated in accordance with one or more embodiments described herein. FIG. 7 illustrates an example block diagram of data storage of the device of FIG. 5 in accordance with embodiments described herein. Repetitive description of like elements employed in respective embodiments of systems and/or apparatus described herein are omitted for sake of brevity.

Turning first to FIG. 5, device 108 can include communication component 500, messaging component 502, back off component 506, offset component 508, transmit delay period component 510, re-transmission component 504, memory 512, processor 514 and/or data storage 516. In various embodiments, one or more of communication component 500, messaging component 502, back off component 506, offset component 508, transmit delay period component 510, re-transmission component 504, memory 512, processor 514 and/or data storage 516 can be communicatively and/or electrically coupled to one another to perform one or more functions of device 108. While device 108 is specifically identified and shown with reference to FIG. 5, in various embodiments, one or more of the structure and/or functionality of device 108 can be included in any of devices 104, 106, 110, 111.

With reference to FIGS. 1, 5, 6 and 7, communication component 500 can transmit and/or receive information to and/or from devices 104, 106, 108, 110, 111. For example, in various embodiments, communication component 500 can transmit and/or receive voice, video, text, data or a combination of voice, video, text and/or data messages to and/or from devices 104, 106, 108, 110, 111. In various embodiments, communication component 500 can receive a multicast message from MSD 102 and/or transmit, via unicast or any other communication approach, a message to MSD 102. For example, communication component 500 can re-transmit, via unicast, an acknowledgement message to MSD 102. For these functions, communication component 500 can include a transceiver, transmitter and/or receiver in various embodiments.

Messaging component 502 can perform one or more functions associated with multicast or unicast communication. For example, in one embodiment, messaging component 502 can receive a multicast message and determine whether the multicast message is intended for device 108. In some embodiments, messaging component 502 can decrypt an encrypted plurality of information identifying one or more devices in a multicast group to which device 108 is affiliated. In various embodiments, messaging component 502 can generally decode multicast message received at multicast group 122 and determine whether action is requested of device 108.

As another example, messaging component 502 can formulate a message according to any number of different protocols for communication. For example, messaging component 502 can formulate an acknowledgement message intended for unicast to MSD 102 in response to receipt by device 108 of a multicast message requesting re-transmission of the acknowledgement message.

In some embodiments, messaging component 502 can generate an acknowledgement message that includes the received signal strength indicator (RSSI) information for the multicast message to which the acknowledgement message relates. For example, upon receipt of a first multicast message, messaging component 502 can generate an acknowledgement message that includes the RSSI information for the first multicast message.

As another example, messaging component 502 can generate address information identifying MSD 102 or any other device as an intended destination of a message to be transmitted from device 108 via communication component 500.

Re-transmission component 504 can generate a message for re-transmission to MSD 102. For example, re-transmission component 504 can generate the message to be re-transmitted, messaging component 502 can format the message for unicast communication and communication component 500 can transmit the message.

In various embodiments, back off component 506 of device 108 can determine a back off period to wait prior to re-transmission of an acknowledgement message requested by MSD 102. In some embodiments, the back off period can also be a period to wait if device 108 determines that the channel is busy and cannot transmit. Device 108 can attempt to transmit again after waiting the back off period. One or more embodiment of the structure and/or functionality of the back off component 506 will be described in greater detail with reference to FIG. 6.

Turning now to FIG. 6, as shown, back off component 506 can include communication component 600, adjustment value selection component 602, random number generation component 604, device count component 606, repeater device count component 608, computation component 610, memory 512, processor 514 and/or data storage 516. One or more of communication component 600, adjustment value selection component 602, random number generation component 604, device count component 606, repeater device count component 608, computation component 610, memory 512, processor 514 and/or data storage 516 can be communicatively and/or electrically coupled to one another to perform one or more functions of back off component 506.

Communication component 600 can receive information for computing a back off period. For example, communication component 600 can receive information indicative of a back off index value associated with or included in multicast message from MSD 102 received at device 108. Communication component 600 can transmit information generated by back off component 506 including, but not limited to, back off period. The back off period can be employed by device 108 to perform a back off of the designated amount of time prior to re-transmission of the acknowledgement message.

In various embodiments, the back off index value received can be a maximum value in a possible range of values since the back off index value is received with a multicast message. The maximum value can be 7 in some embodiments.

In some embodiments, the back off index value is a function of the number of devices in the multicast group with which device 108 is associated. As the number of devices in the multicast group increases, the back off index value increases. For example, in various embodiments, back off index value can be 0, 1, 2, 3 or 7.

In some embodiments, the back off index value is a function of the number of devices in the multicast group with which device 108 is associated and a number of repeater devices utilized by device 108 to transmit and/or receive messages to and/or from MSD 102. In some embodiments, as the combined number of devices in the multicast group and repeater devices increases, the back off index value increases.

In some embodiments, the back off index value is a function of the congestion in the network and/or previous re-transmissions requested by MSD 102 for device 108 and/or previous acknowledgment messages received from device 108 at MSD 102. For example, the back off index value can be incremented by 2 for every packet re-transmission requested of device 108, and decremented by 1 for every acknowledgement message received from device 108 by MSD 102.

Adjustment value selection component 602 can determine a value based on the back off index value received by communication component 600. For example, adjustment value selection component 602 can select an adjustment value of 50 if the back off index value is 0. Adjustment value selection component 602 can select an adjustment value of 60 if the back off index value is 1. Adjustment value selection component 602 can select an adjustment value of 100 if the back off index value is 2. Adjustment value selection component 602 can select an adjustment value of 125 if the back off index value is 3. Adjustment value selection component 602 can select an adjustment value of 150 if the back off index value is 7.

Random number generation component 604 can generate a random number that can be used by computation component 610 to compute the back off period. In some embodiments, random number generation component 604 generates a number between 0 and 1.

Device count component 606 can determine the number of devices in the multicast group with which device 108 is associated. Repeater device count component 610 can determine the number of repeater devices employed by device 108 to receive a multicast message from MSD 102 and/or to transmit a message to MSD 102.

Computation component 610 can be configured to compute the back off period. The back off period can be computed in a number of different ways.

In some embodiments, computation component 610 computes the back off period based on the number of devices in the multicast group with which device 108 is associated. For example, computation component 610 can compute back off period by receiving information indicative of the number of devices in the multicast group with which device 108 is associated. Computation component 610 can determine the back off period as a function of the number of devices. In one embodiment, computation component 610 can determine the back off period as the product of the number of devices in the multicast group and a defined amount of time. For example, if the defined amount of time is 2 ms, and the number of devices in the multicast group is 5, computation component 610 can determine the back off period to be 10 ms.

In some embodiments, computation component 610 computes the back off period based on a combination of the number of repeater devices utilized by device 108 to receive information from and transmit information to MSD 102, and the number of devices in the multicast group. In one embodiment, computation component 610 can determine the back off period as the product of the combination of repeater devices and devices in the multicast group and a defined amount of time. For example, if the defined amount of time is 2 ms, the number of repeater devices utilized by device 108 is 3 and the number of devices in the multicast group is 5, computation component 610 can determine the back off period to be 16 ms.

In some embodiments, computation component 610 computes the back off period as a function of the back off index value received at back off component 506, an adjustment value selected by adjustment value selection component 602 and/or a random number generated by random number generation component 604. For example, computation component 610 can receive information indicative of a random number generated by random number generation component 604 and multiply the random number by a percentage to generate an initial back off period. The initial back off period can be added to the adjustment value selected by adjustment value selection component 602 to generate the back off period.

In one example, random number generation component 604 generates a random number. Computation component 610 receives the random number and determines the product of the random number and 100 percent to generate an initial back off period. In other embodiments, the computation component 610 receives the random number and determines the product of the random number and 250 percent to generate an initial back off period.

In embodiments in which the back off index value is equal to 0, adjustment value selection component 602 can select a first value and computation component can receive the first value and add the first value to the initial back off period to generate a back off period. In some embodiments, the first value is approximately 50 ms.

In embodiments in which the back off index value is equal to 0, adjustment value selection component 602 can select a second value and computation component 610 can receive the second value and add the second value to the initial back off period to generate a back off period. In some embodiments, the second value is approximately 60 ms.

In embodiments in which the back off index value is equal to 1, adjustment value selection component 602 can select a second value and computation component 610 can receive the second value and add the second value to the initial back off period to generate a back off period. In some embodiments, the second value is approximately 60 ms.

In embodiments in which the back off index value is equal to 2, adjustment value selection component 602 can select a third value and computation component 610 can receive the third value and add the third value to the initial back off period to generate a back off period. In some embodiments, the third value is approximately 100 ms.

In embodiments in which the back off index value is equal to 3, adjustment value selection component 602 can select a fourth value and computation component 610 can receive the fourth value and add the fourth value to the initial back off period to generate a back off period. In some embodiments, the fourth value is approximately 125 ms.

In some embodiments in which the back off index value is equal to 7, adjustment value selection component 602 can select a fifth value and computation component 610 can receive the fifth value and add the fifth value to the initial back off period to generate a back off period. In some embodiments, the fifth value is approximately 125 ms.

In other embodiments in which the back off index is 7 (e.g., the maximum value in some embodiments), back off computation component 600 can compute a random value, convert the random value to a percent and multiply by 250, then add the value to a fifth value (e.g., 50) to get the final back off value. In embodiments in which the back off index is any other value, the back off value can be back off value+150.

Computation component 610 can generate the back off period and back off component 506 can output the back off period to messaging component 502 and/or communication component 500. Messaging component 502 and/or communication component 500 can wait an amount of time substantially equal to the back off period before re-transmitting the acknowledgement message requested by MSD 102.

Typically, a small network will result in a small back off period. As collisions increase, the back off period is increased. In some embodiments, all multicast acknowledgement messages are sent to MSD 102 with the largest multicast range possible. This is important since a multicast response may generate more collisions. In other embodiments, the minimum range increases as congestion increases.

Turning back to FIG. 5, offset component 508 can be a component that computes an offset that device 108 employs to compute a transmit delay period that device 108 waits prior to re-transmission of the acknowledgement message. Transmit delay period component 510 can be configured to compute the transmit delay period employing the offset computed by offset component 508 and the back off period computed by back off device 506.

Various different embodiments for computing transmit delay period can be employed as described below. In one embodiment, offset component 508 can compute the offset based on the number of devices in the multicast group with which device 108 is associated. For example, the offset can be computed as the product of the number of devices in the multicast group with which device 108 is associated, and a constant indicative of an amount of time. For example, the offset can be the product of the value of the multicast acknowledgement flag (e.g., a flag indicating the number of devices in a multicast group to which device 108 belongs) and constant X.

In this embodiment, back off component 506 can utilize a received back off period and/or compute a back off period. The range of the back off period can vary based on the multicast group size and number of devices requested to re-transmit an acknowledgement message. As such, the back off period can be dynamically tailored to the network conditions to improve the likelihood of transmission efficiency and low latency. MSD 102 can indicate the back off period in the packet sent from MSD 102, for example.

In some embodiments, the back off period can be set by MSD 102 and can increase (e.g., become a longer period of time) with each round of re-transmitted acknowledgements transmitted by MSD 102. For example, when an initial message is transmitted from MSD 102, MSD 102 can set the back off period to 0. If the MSD 102 determines that a request for re-transmission of one or more acknowledgement messages is needed, MSD 102 re-sends the multicast message; however, the back off period is incremented. In some embodiments, each subsequent request for an acknowledgement re-transmission for the initial message sent can result in MSD 102 incrementing the back off period by a defined value (e.g., 1 or otherwise).

Accordingly, in this embodiment, the back off period increases with an increase in the number of devices in the multicast group, and decreases with a decrease in the number of devices in the multicast group.

In some embodiments, the back off period can increase with a number of re-transmissions of the acknowledgement by a device (e.g., device 108). For example, the back off period can be a first value on the first re-transmission to acknowledge a particular multicast message and can be incremented to a larger value upon the second or subsequent re-transmission to acknowledge the multicast message.

In some embodiments, the back off period can vary depending on the device value assigned to the device within the multicast group at discovery. For example, if device 108 is assigned bit position 0, device 108 has a first back off period whereas if device 108 is assigned the second bit position, device 108 has a different back off period. In any case, transmit delay period component 510 randomly selects a value within the back off period.

Transmit delay period component 510 can calculate transmit delay period in a first embodiment such that device 108 can wait prior to re-transmission of the acknowledgement as shown in equation 1:

$$\text{Transmit delay period} = (\text{Multicast Acknowledgement Flag Information} * X \text{ ms}) + (\text{rand(back off period)} * Y \text{ ms}) \quad (1)$$

The value of rand(back off period) can be a randomly selected number in the range defined by the back off period. In some embodiments, transmit delay period component 510 can determine the randomly selected number. For example, if the back off period is 2 ms, rand(back off period) can generate a value between 0 and 2 (e.g., 0.5, 1.7, 1.9, 2).

Y can be a function of the number of devices for which re-transmission is requested in the multicast group to which device 108 is assigned. For example, Y can be a value that represents a number of milliseconds by which to increase the value of rand(back off period).

Accordingly, as described above, the multicast acknowledgement flag information has a value that indicates the number of multicast devices in a group and X is a constant that represents a first number of milliseconds to increase the offset for each device in the multicast group. For example, if there are eight devices in the group, the multicast acknowledgement flag information is assigned the value eight or information associated with the value eight. The offset component 508 computes the offset as the product of the multicast acknowledgement flag information and X. As such, the offset increases as the number of devices in the multicast group increases. Thus, Equation 1 specifies an approach for increasing the wait time when the multicast group is large as, in such cases, the chance of collision could be greater than in cases in which the multicast group has fewer devices.

Transmit delay period component 510 can compute the transmit delay period specified by equation 1, wait the transmit delay period after receipt of the multicast message requesting re-transmission and then re-transmit the acknowledgement message.

In a second embodiment, transmit delay period component 510 can compute the transmit delay period as a function of offset and randomly generated back off period (as with equation 1). However, in lieu of X being a constant value such that offset increases linearly with an increase in the number of devices in the multicast group, X can take on various values in a look-up table such that offset is a non-linear function of the number of devices in the multicast group. Accordingly, equation 1 can be employed with the product of multicast acknowledgement flag information and X being a non-linear function. The values of X can be accessible by MSD 102 and/or device 108 in various embodiments.

In another third embodiment, transmit delay period component 510 can compute transmit delay periods that vary as a function of the number of repeaters in the network. For example, transmit delay period component 510 can increase the transmit delay period in proportion to the number of repeaters in the network. Specifically, since a repeater doubles the number of transmissions originated from MSD 102 (and effectively appears to make the multicast group size increased by the number of repeaters), when a repeater is determined to be present in the network, the values for X and Y can be increased (relative to the X and Y values in the first embodiment in which repeaters are not accounted for). In this embodiment, the equation can once again be the same as that shown for equation 1 but the values of X and Y can be larger values than those for scenario 1.

In a fourth embodiment, equation 1 can be optimized to account for conditions in which the number of devices for which re-transmission of acknowledgement is requested is small relative to (or at least less than) the number of total devices in the multicast group. The optimization in equation 2 is performed since equation 1 increases transmit delay period with increase in multicast group size, regardless of the number of devices for which re-transmission is requested. As such, devices can wait needless time prior to re-transmitting in some cases. Latency increases and overall system efficiency can decrease.

In this fourth embodiment, transmit delay period component 510 computes transmit delay period as a function of the offset and randomly selected number in the back off period, as with equation 1. However, transmit delay period component 510 also computes the transmit delay period as a function of the actual number of devices in the multicast group to which device 108 is assigned for which re-transmission is requested by MSD 102. For example, equation 2 is shown below:

Transmit delay period=(Multicast Acknowledgement Flag Information*$X$ ms)+(rand(back off period)*$Y$ ms)*[Number of bits set in the ACK request field]     (2)

The number of bits set in the ACK request field is the number of bits that are requested to re-transmit an acknowledgement message. As shown, the offset is computed and the randomly selected back off time is reduced as the number of bits selected for re-transmission of the acknowledgement message is reduced. Similarly, the randomly selected back off time is increased as the number of bits selected for re-transmission of the acknowledgement message is increased.

Accordingly, the overall transmit delay period increases with increase in number of devices for which re-transmission is requested and decreases with decrease in number of devices for which transmission is requested. Further, if a device is the only component for which re-transmission is requested (e.g., and therefore the bits set indicate only that particular device needs to re-transmit), in lieu of having an increased back off period and causing the device to wait a number of time slots equal to the bit value associated with the device, the device can transmit sooner and need not wait the time slots device would typically wait.

Turning back to FIG. 5, memory 512 can be a computer-readable storage medium storing computer-executable instructions and/or information for performing the functions described herein with reference to devices 104, 106, 108, 110, 111 (or any component of devices 104, 106, 108, 110, 111). For example, memory 512 can store computer-executable instructions that can be executed by processor 514 to perform reception of multicast messages from MSD 102, transmission of unicast acknowledgement messages to MSD 102, determination of addressing information included in a multicast message to determine whether the message requests the device re-transmit an acknowledgment message, determination of a back off period, determination of an offset, determination of a transmit delay period, determination of randomly selected time within back off period, various communications processing methods or any other functions executed by the device. Processor 514 can perform one or more of the functions described herein with reference to devices 104, 106, 108, 110, 111 (or any component of devices 104, 106, 108, 110, 111) including, but not limited to, reception of multicast messages from MSD 102, transmission of unicast acknowledgement messages to MSD 102, determination of addressing information included in a multicast message to determine whether the message requests the device re-transmit an acknowledgment message, determination of a back off period, determination of an offset, determination of a transmit delay period, determination of randomly selected time within back off period, various communications processing methods or any other functions executed by devices 104, 106, 108, 110, 111.

Data storage 516 can be described in greater detail with reference to FIG. 7. As shown in FIG. 7, data storage 516 can be configured to store information accessed by, received by and/or processed by devices 104, 106, 108, 110, 111. For example, data storage 516 can store back off contribution information 702 such as information about an amount of time that each identified device or repeater device in a network can contribute to a back off period computed by devices 104, 106, 108, 110, 111. Back off contribution information can change or vary from time to time.

As another example, data storage 516 can store network device information 704 such as information identifying a number of devices in a network. For example, the number of devices can be the number of devices in network 118 for data storage 516 of device 108 (or for data storage of any other device in network 118).

As another example, data storage 516 can store network repeater information 706 such as information identifying a number of repeater devices in a network. For example, the number of repeater devices can be the number of repeater devices in network 118 for data storage 516 of device 108 (or for data storage of any other device in network 118).

As another example, data storage 516 can store back off period information 708 such as information describing current or past back off periods computed by a device in the network. For example, back off period information 708 can be or include information indicative of the back off period employed by device 108 when device 108 previously received a request for re-transmission of acknowledgment message from MSD 102 and/or information indicative of pre-stored back off periods generated outside of device 108 and accessed by device 108.

As another example, data storage 516 can store offset information 710 and/or offset lookup table information 712 (e.g., values of X when offset is a non-linear function of the number of devices in the multicast group).

As another example, data storage 516 can store transmit delay period computation information 714 (e.g., values for X and Y for computation of transmit delay period, equations for computation of transmit delay period).

Figure 8:
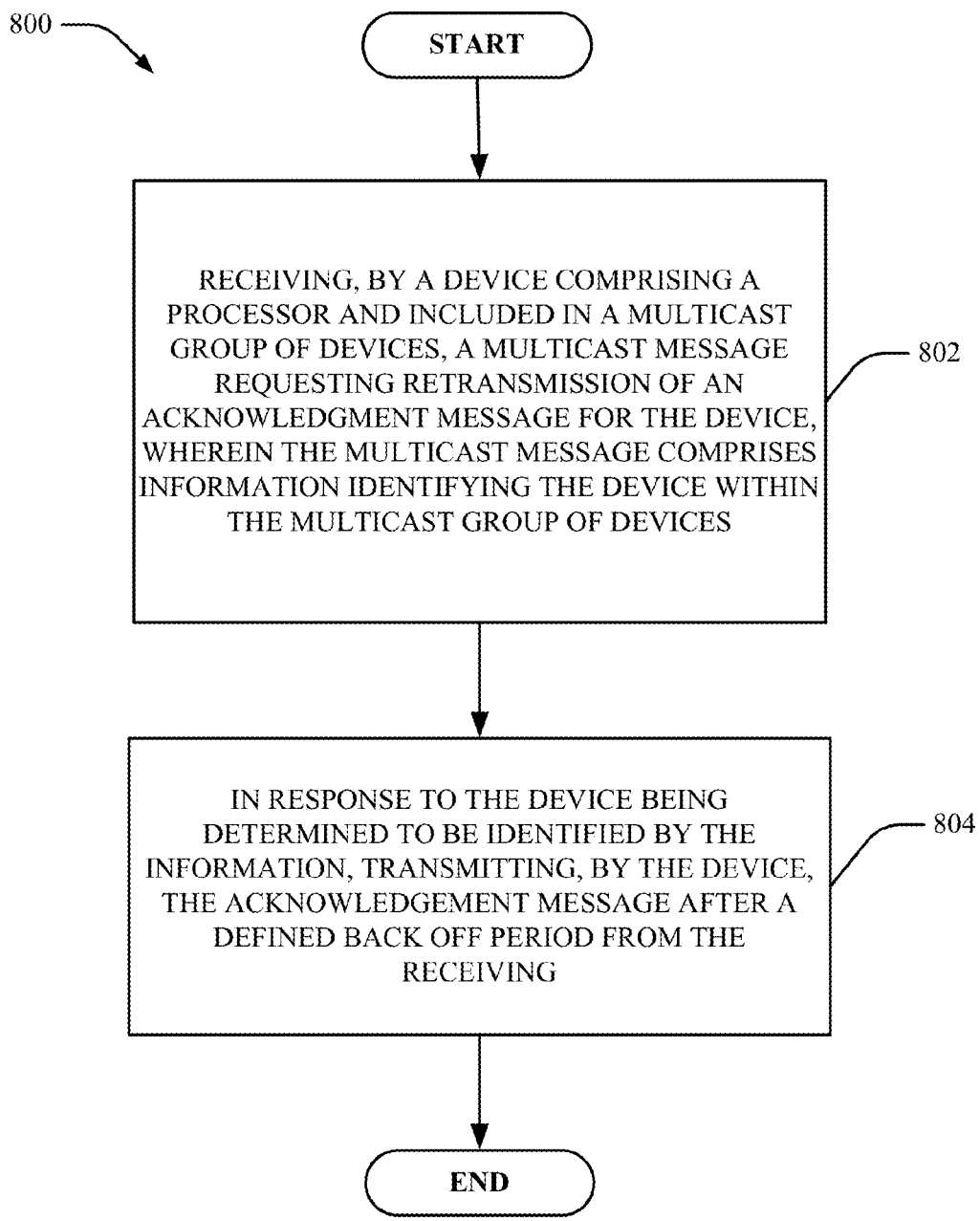
FIGS. 8-14 illustrate example flowcharts of methods that facilitate multicast traffic collision reduction in accordance with one or more embodiments described herein.

FIGS. 8-14 illustrate example flowcharts of methods that facilitate multicast traffic collision reduction in accordance with one or more embodiments described herein. Turning first to FIG. 8, at 802, method 800 can include receiving, by a device comprising a processor and included in a multicast group of devices, a multicast message requesting re-transmission of an acknowledgment message for the device, wherein the multicast message comprises information identifying the device within the multicast group.

At 804, method 800 can include, in response to the device being determined to be identified by the information, transmitting, by the device, the acknowledgement message after a defined transmit delay period from the receiving. Although not shown, in various embodiments, method 800 can also include determining the defined transmit delay period.

Figure 9:
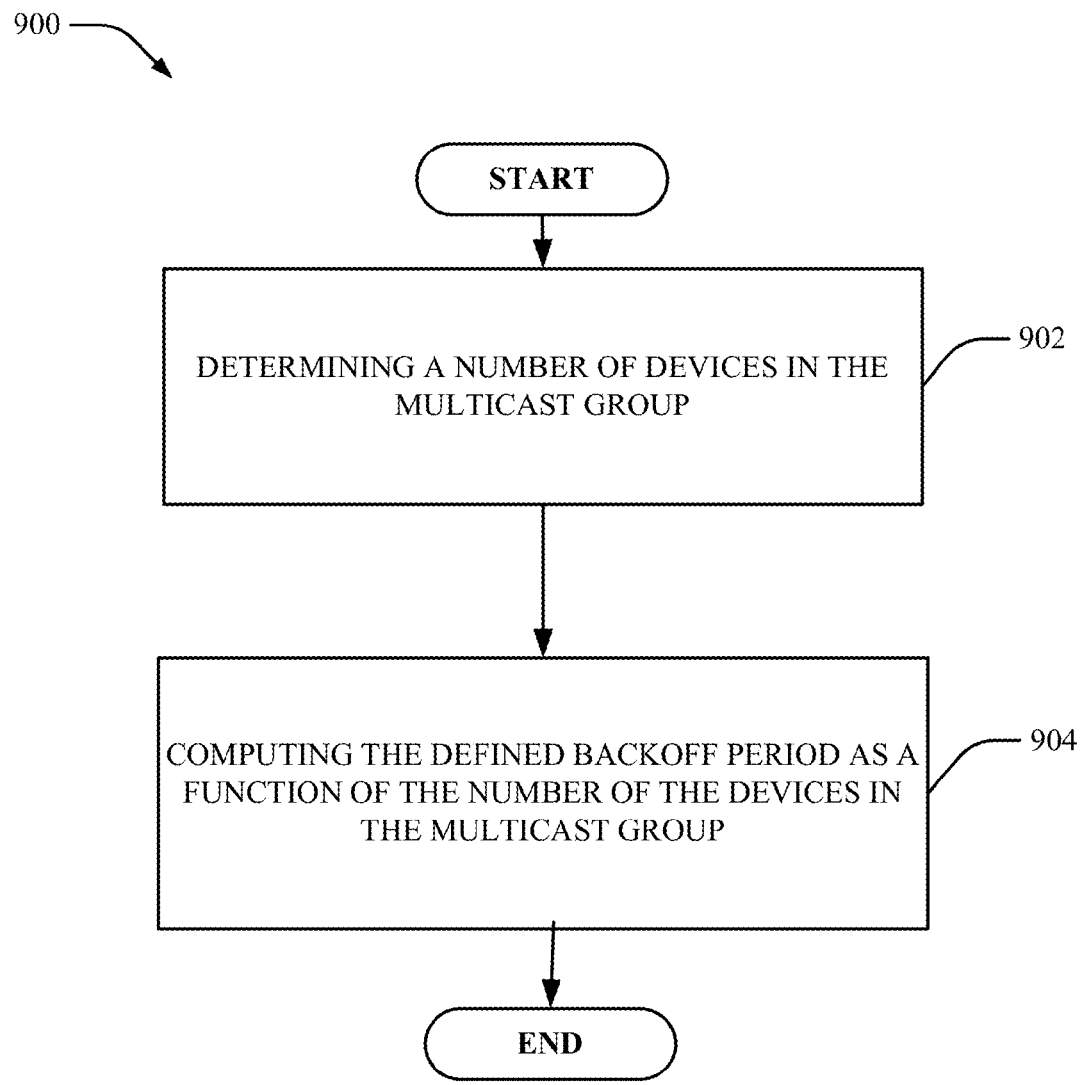

FIGS. 9, 10, 11, 12, 13 and 14 illustrate and describe methods of determining the defined transmit delay period or back off period. Turning first to FIG. 9, at 902, method 900 can include determining a number of devices in the multicast group. At 904, method 900 can include computing the defined transmit delay period as a function of the number of devices in the multicast group. As the number of devices increases, the transmit delay period can increase.

Figure 10:
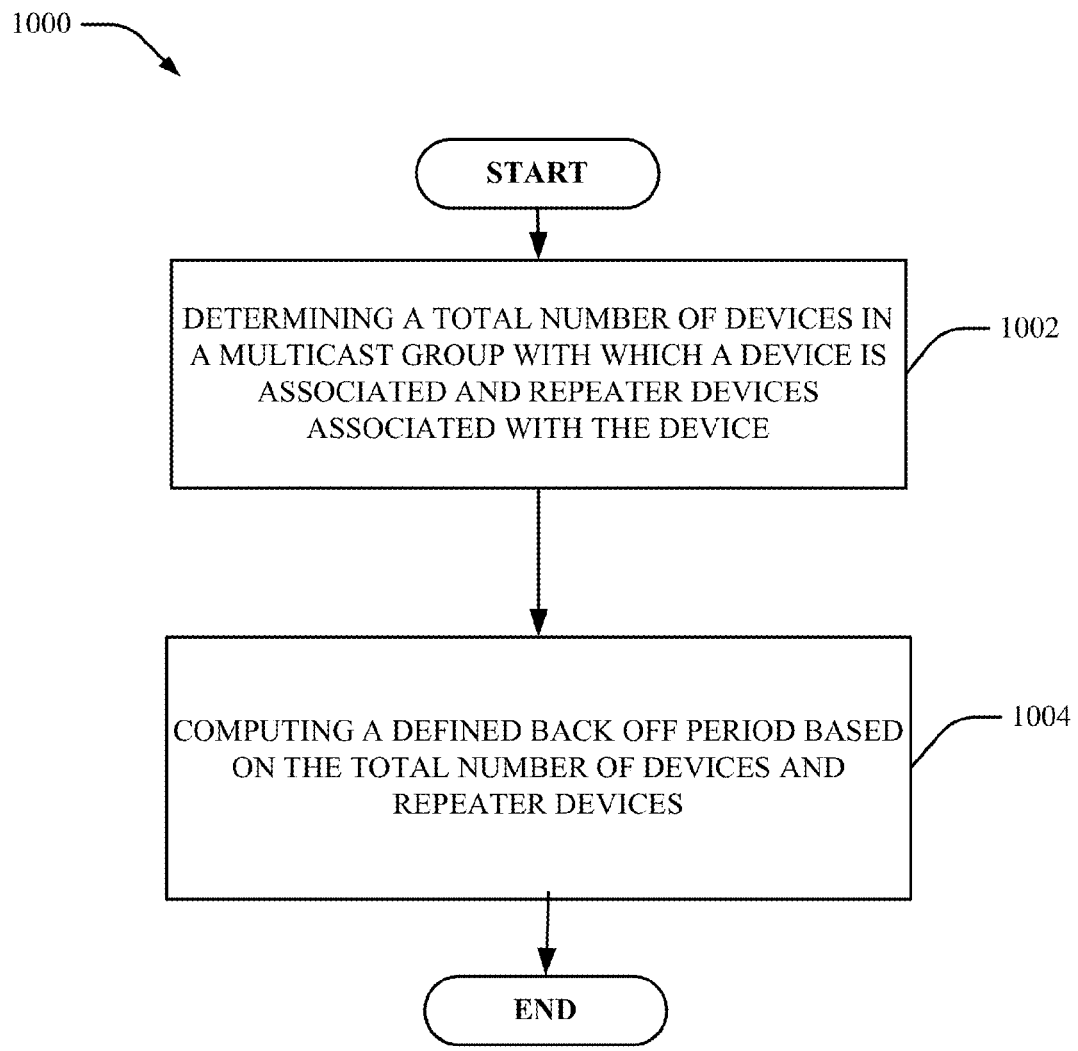

Turning now to FIG. 10, at 1002, method 1000 can include determining a total number of devices in a multicast group with which a device is associated and repeater devices associated with the device. At 1004, method 1000 can include computing a defined transmit delay period based on the total number of devices and repeater devices.

Figure 11:
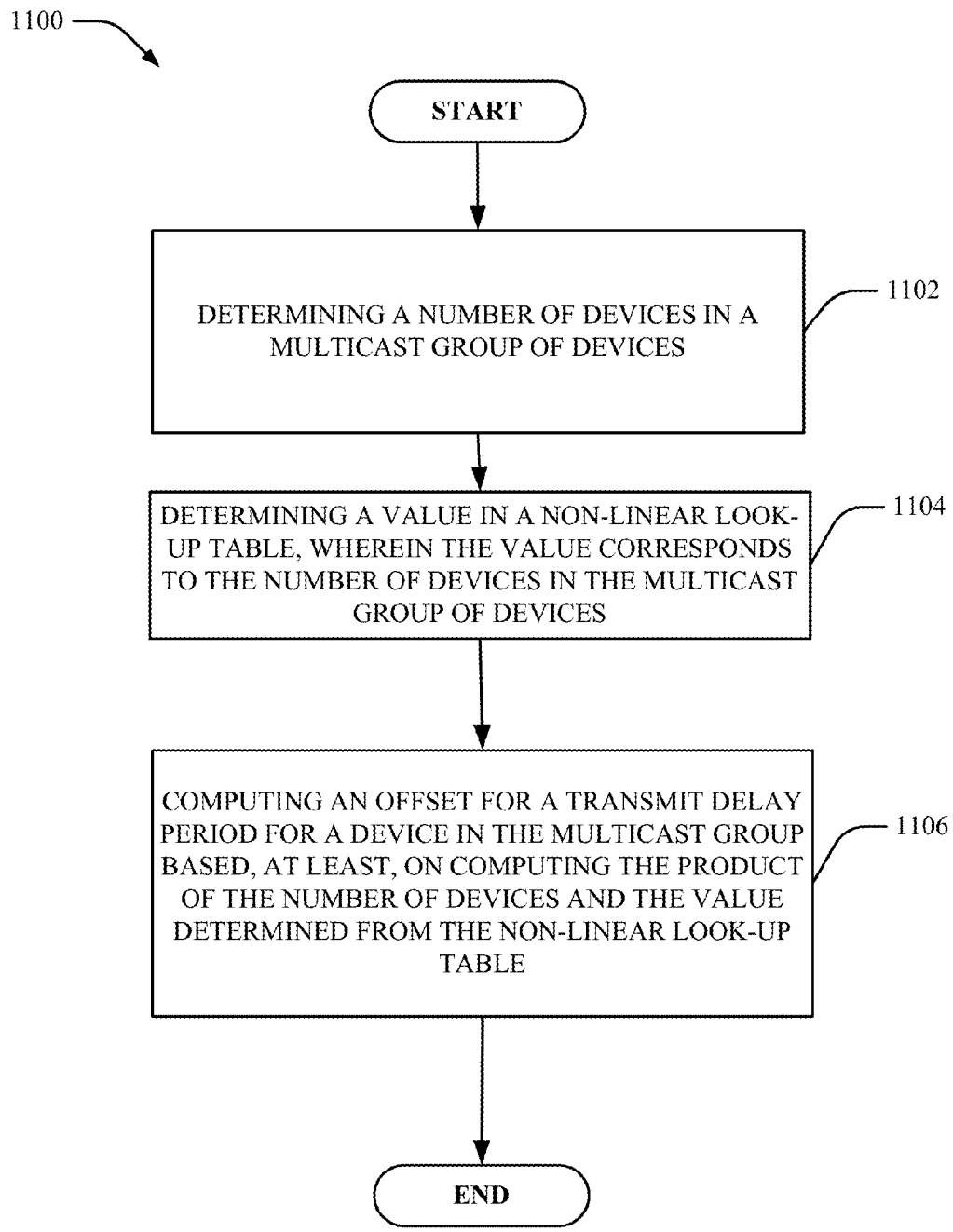

Turning now to FIG. 11, at 1102, method 1100 can include determining a number of devices in a multicast group of devices. At 1104, method 1100 can include determining a value in a non-linear look-up table, wherein the value corresponds to the number of devices in the multicast group of devices. At 1106, method 1100 can include computing an offset for a transmit delay period for a device in the multicast group based, at least, on computing the product of the number of devices and the value determined from the non-linear look-up table.

Figure 12:
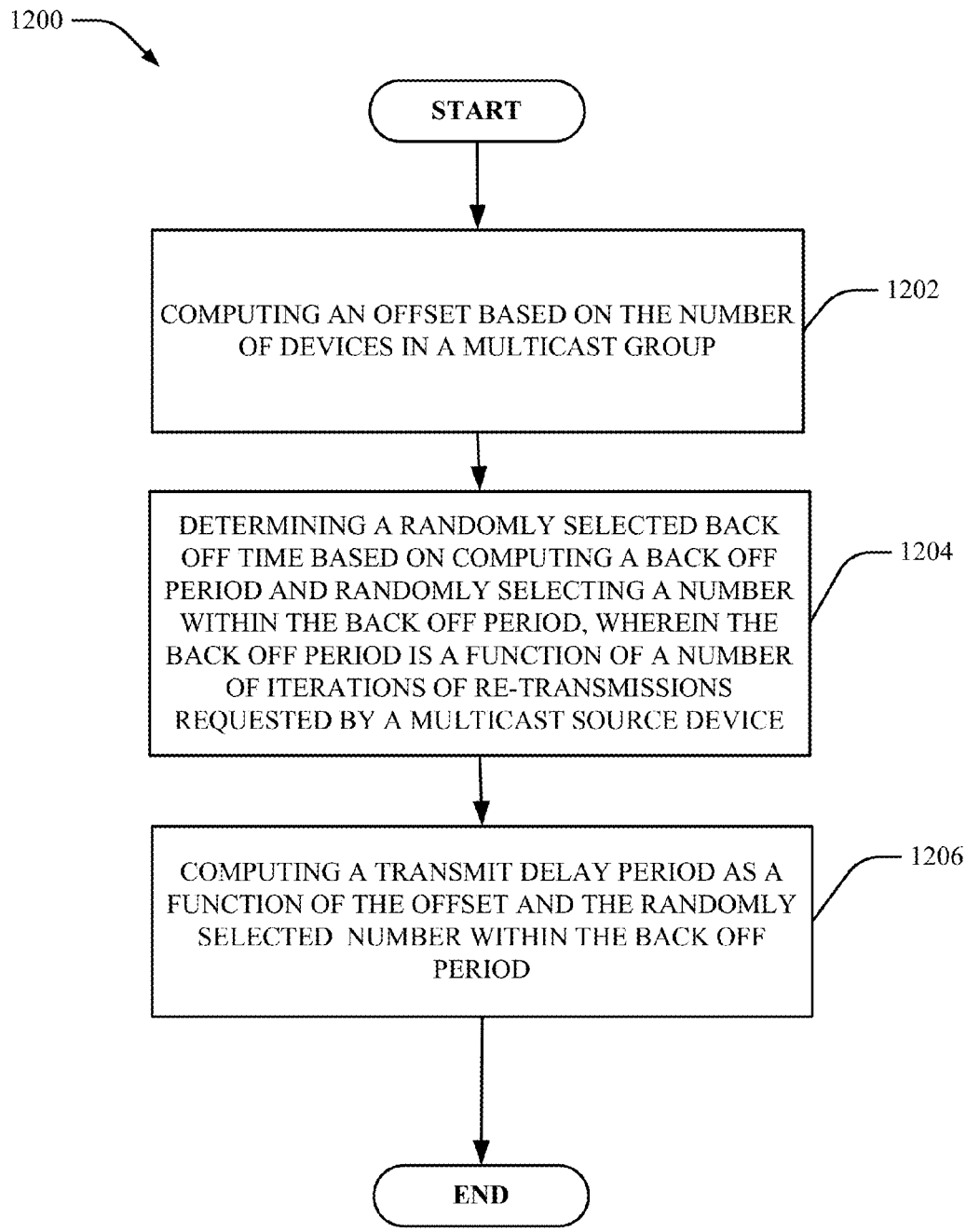

Turning now to FIG. 12, at 1202, method 1200 can include computing an offset based on the number of devices in a multicast group. At 1204, method 1200 can include determining a randomly selected back off time based on computing a back off period and randomly selecting a number within the back off period, wherein the back off period is a function of a number of iterations of re-transmissions requested by an MSD for a particular device.

At 1206, method 1200 can include computing a transmit delay period as a sum of the offset and the randomly selected value within the back off period.

Figure 13:
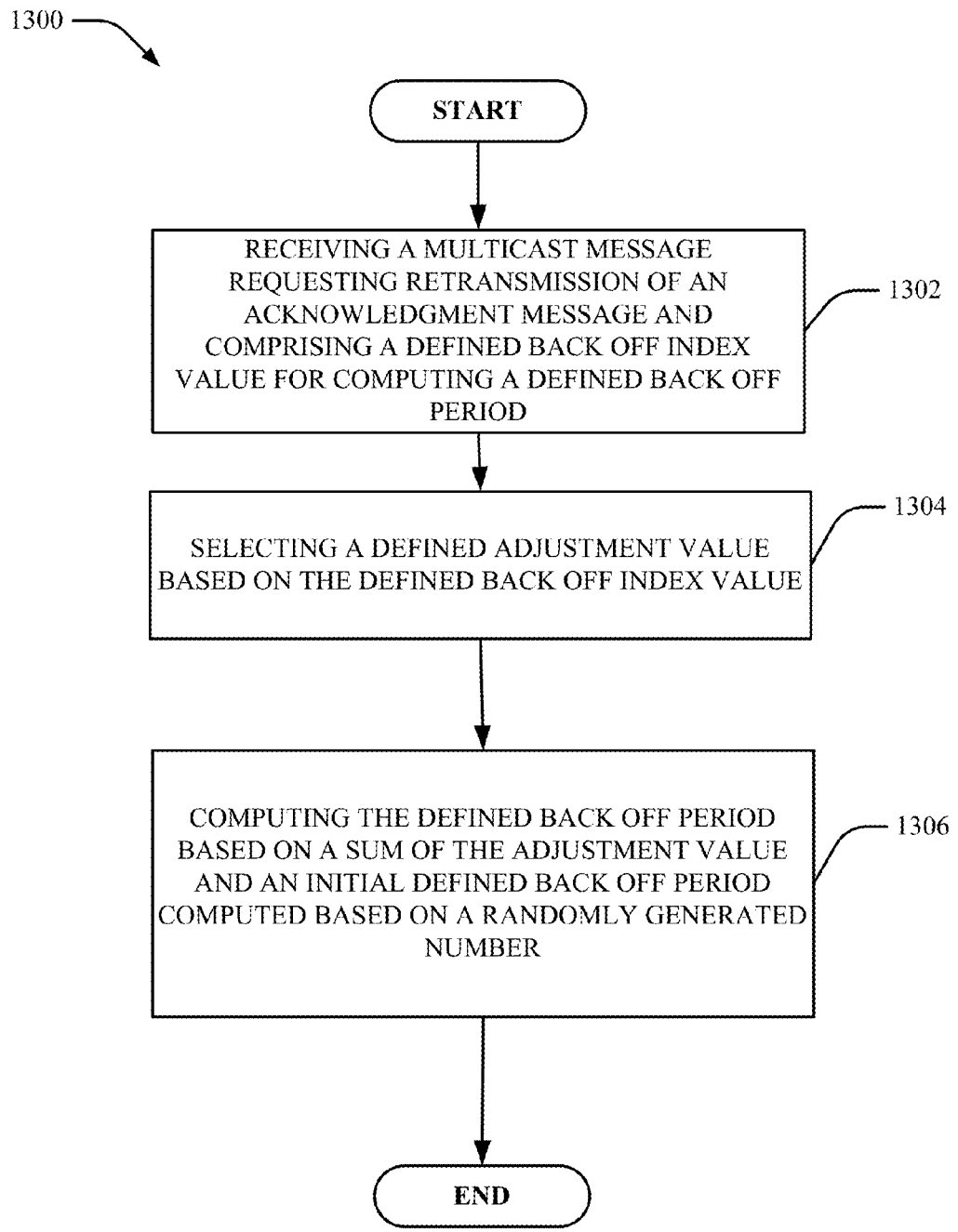

Turning now to FIG. 13, at 1302, method 1300 can include receiving a multicast message requesting re-transmission of an acknowledgment message and comprising a back off index value for computing a back off period. At 1304, method 1300 can include selecting an adjustment value based on the back off index value. At 1306, method 1300 can include determining the back off period based on a function of the adjustment value and an initial back off period computed based on a randomly generated number. In some embodiments, the determination can include computing a sum of the adjustment value and the initial back off period.

Figure 14:
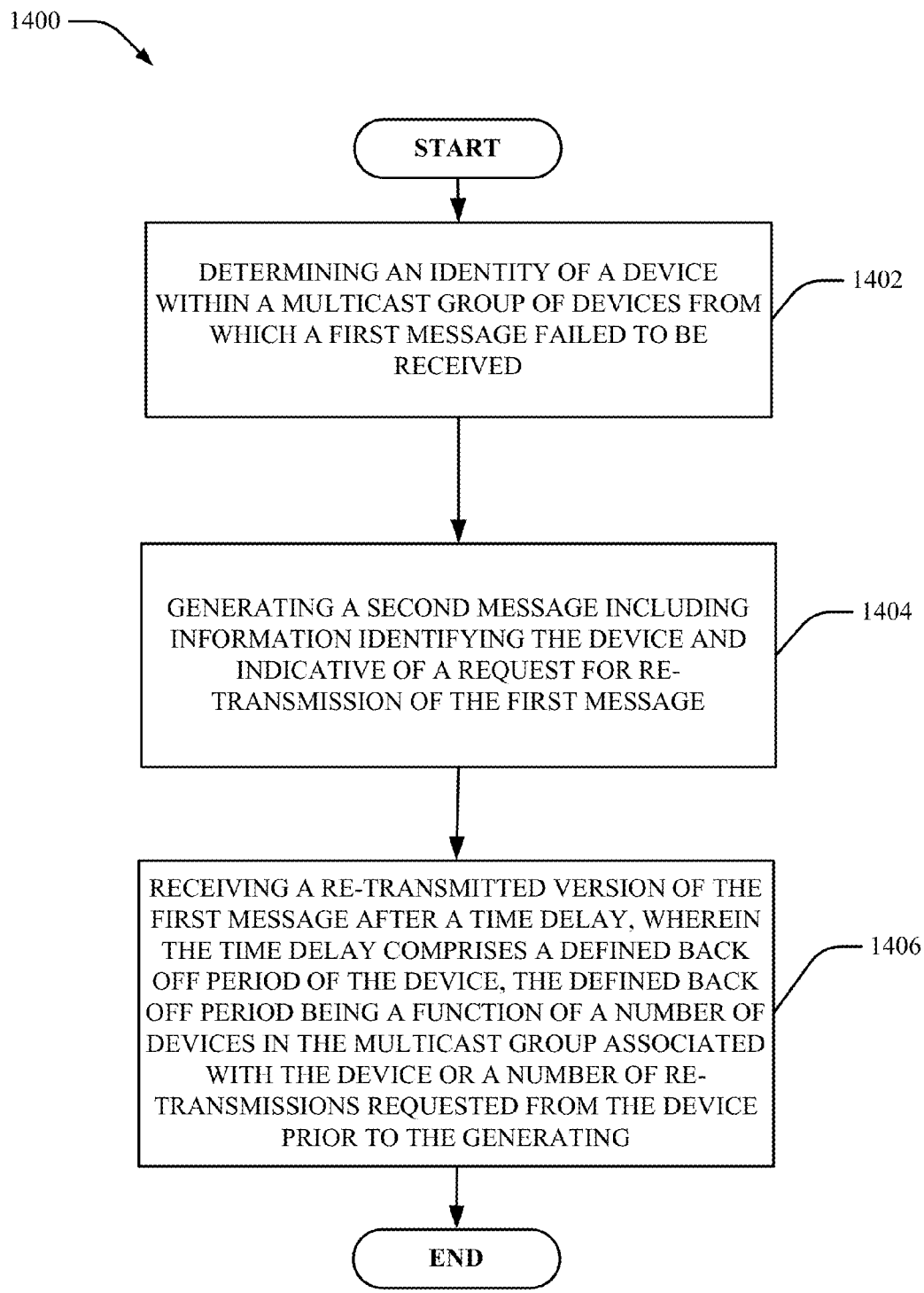

Turning now to FIG. 14, at 1402, method 1400 can include determining an identity of a device within a multicast group from which a first message failed to be received. At 1404, method 1400 can include generating a second message comprising information identifying the device and indicative of a request for re-transmission of the first message. At 1406, method 1400 can include receiving a re-transmitted version of the first message after a time delay, wherein the time delay comprises a defined back off period of the device, the defined back off period being a function of a number of devices in the multicast group associated with the device or a number of re-transmissions requested from the device prior to the generating.

Figure 15:
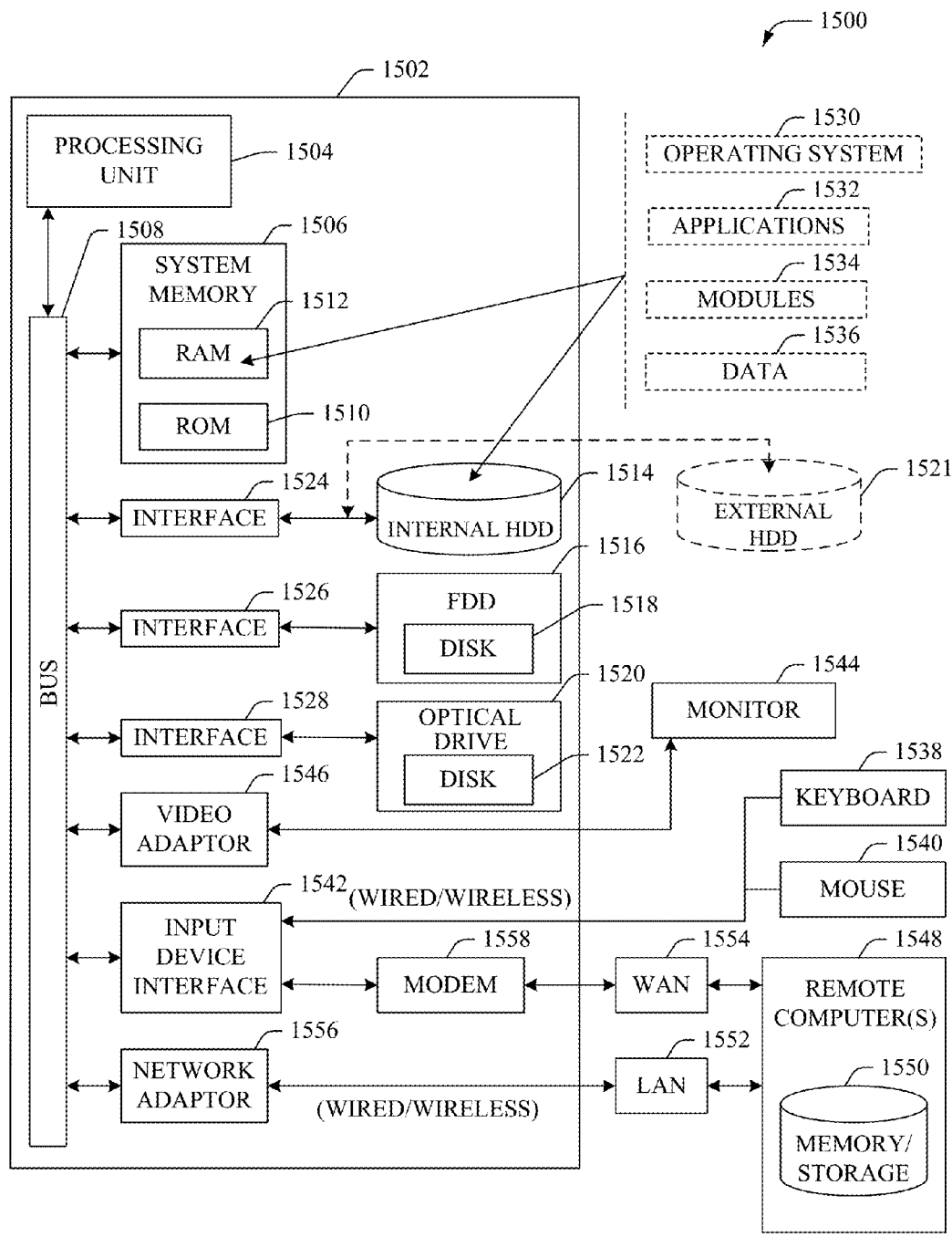
FIG. 15 illustrates a block diagram of a computer operable to facilitate multicast traffic collision reduction in accordance with one or more embodiments described herein.

FIG. 15 illustrates a block diagram of a computer operable to facilitate multicast traffic collision reduction in accordance with one or more embodiments described herein. For example, in some embodiments, the computer can be or be included within gateway device 102 and/or device 500.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the embodiments described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), which internal hard disk drive 1514 can also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). In some embodiments, computer 1502 can include external HDD 1521. The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

A mobile device can enter commands and information into the computer 1502 through one or more wired/wireless input devices, e.g., a keyboard 1538 and a pointing device, such as a mouse 1540. Other input devices (not shown) can include a microphone, an infrared (IR) remote control, a joystick, a game pad, a stylus pen, touch screen or the like. These and other input devices are often connected to the processing unit 1504 through an input device interface 1542 that can be coupled to the system bus 1508, but can be connected by other interfaces, such as a parallel port, an IEEE 1394 serial port, a game port, a universal serial bus (USB) port, an IR interface, etc.

A monitor 1544 or other type of display device can be also connected to the system bus 1508 via an interface, such as a video adapter 1546. In addition to the monitor 1544, a computer typically includes other peripheral output devices (not shown), such as speakers, printers, etc.

The computer 1502 can operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1552 through a wired and/or wireless communication network interface or adapter 1556. The adapter 1556 can facilitate wired or wireless communication to the LAN 1552, which can also include a wireless AP disposed thereon for communicating with the wireless adapter 1556.

When used in a WAN networking environment, the computer 1502 can include a modem 1558 or can be connected to a communications server on the WAN 1554 or has other means for establishing communications over the WAN 1554, such as by way of the Internet. The modem 1558, which can be internal or external and a wired or wireless device, can be connected to the system bus 1508 via the input device interface 1542. In a networked environment, program modules depicted relative to the computer 1502 or portions thereof, can be stored in the remote memory/storage device 1550. It will be appreciated that the network connections shown are example and other means of establishing a communications link between the computers can be used.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a mobile device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing mobile device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of mobile device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. The values and units of time provided herein are mere examples and any number of different values and units of time can be employed. All such variations are envisaged. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus, comprising:
   a processor; and
   a memory that stores executable instructions that, when executed by the processor, facilitate performance of operations, comprising:
     receiving, by the apparatus, a multicast message that comprises information:
       identifying the apparatus within a multicast group of apparatuses; and
       representing a request for re-transmission of an acknowledgement message; and
     in response to a determination that the apparatus is identified by the information, transmitting the acknowledgement message after a defined transmit delay period from the receiving, wherein the defined transmit delay period is a function of a defined back off period, wherein a back off index value of the defined back off period is incremented by a first defined value based on a number of re-transmissions by the apparatus and is decremented by a second defined value for every acknowledgement message received from the apparatus, and wherein the defined back off period is determined as a function of a back off adjustment value and an initial back off period computed based on a randomly-generated number.

2. The apparatus of claim 1, wherein the defined transmit delay period is further determined based on a number of apparatuses within the multicast group of apparatuses.

3. The apparatus of claim 2, wherein the defined transmit delay period increases as the number of apparatuses within the multicast group of apparatuses increases.

4. The apparatus of claim 2, wherein the defined transmit delay period is further determined based on a number of apparatuses within the multicast group of apparatus for which the re-transmission of the acknowledgement message is requested.

5. The apparatus of claim 2, wherein the defined transmit delay period is further determined based on a number of repeater devices of a network in which the apparatus is located.

6. The apparatus of claim 2, wherein the defined transmit delay period is further determined based on a number of acknowledgment messages re-transmitted prior to the receiving the multicast message.

7. The apparatus of claim 1, wherein the defined back off period is a maximum value within a range of back off values.

8. The apparatus of claim 1, wherein the operations further comprise:
   determining the defined transmit delay period, and wherein the defined first value is greater than the defined second value.

9. The apparatus of claim 1, wherein the operations further comprise:
   determining the defined back off index value associated with the multicast message requesting re-transmission of the acknowledgment message;
   selecting the back off adjustment value based on the defined back off index value
   computing the defined back off period.

10. The apparatus of claim 9, wherein the computing the defined back off period comprises:
    determining a sum of the back off adjustment value and the initial back off period.

11. A method, comprising:
    receiving, by a device comprising a processor and included in a multicast group of devices, a multicast message requesting re-transmission of an acknowledgment message for the device, wherein the multicast message comprises information identifying the device within the multicast group of devices; and
    in response to the device being determined to be identified by the information, transmitting, by the device, the acknowledgement message after a defined transmit delay period after the receiving, wherein the defined transmit delay period is a function of a defined back off period determined as a function of a back off adjustment value and an initial back off period computed based on a randomly-generated number, and wherein a back off index value of the defined back off period is incremented by a first defined value based on a number of re-transmissions by the apparatus.

12. The method of claim 11, wherein the defined transmit delay period is further determined based on a number of devices within the multicast group of devices.

13. The method of claim 12, wherein the defined transmit delay period increases as the number of devices within the multicast group of devices increases.

14. The method of claim 12, wherein the defined transmit delay period is further determined based on a number of devices within the multicast group of devices for which the re-transmission of the acknowledgement message is requested.

15. The method of claim 12, wherein the defined transmit delay period is further determined based on a number of repeater devices of a network in which the device is located.

16. The method of claim 12, wherein the re-transmissions comprises the number of re-transmissions prior to the receiving the multicast message.

17. The method of claim 11, wherein the defined back off period is a maximum value within a range of back off values.

18. A non-transitory machine-readable storage medium, comprising executable instructions that, when executed by a processor, facilitate performance of operations, comprising:
receiving a multicast message requesting re-transmission of a message by a device, wherein the multicast message comprises information identifying the device within a multicast group of devices; and
in response to the device being determined to be identified by the information, re-transmitting the message after a defined transmit delay period delay following reception of the multicast message, wherein the defined transmit delay period is a function of a defined back off period determined as a function of a back off adjustment value and an initial back off period computed based on a randomly-generated number, and wherein a back off index value of the defined back off period is decremented by a first defined value for every acknowledgement message received from the apparatus.

19. The non-transitory machine-readable storage medium of claim 18, wherein the operations further comprise:
determining the defined transmit delay period delay, wherein the defined transmit delay period delay is also a function of a number of devices in the multicast group of devices.

20. The apparatus of claim 1, wherein the first defined value is equal to twice the second defined value.

* * * * *